United States Patent
Jiang et al.

(10) Patent No.: US 12,235,216 B2
(45) Date of Patent: Feb. 25, 2025

(54) OPTICAL IMAGING SYSTEM AND BIOCHEMICAL SUBSTANCE DETECTION SYSTEM USING SAME

(71) Applicant: MGI Tech Co., Ltd., Shenzhen (CN)

(72) Inventors: Heming Jiang, Shenzhen (CN); Yi Huang, Shenzhen (CN); Qian Deng, Shenzhen (CN); Bin Yang, Shenzhen (CN); Xin Wen, Shenzhen (CN); Mingyou Cao, Shenzhen (CN); Yanqiao Huang, San jose, CA (US); Ziyi Wu, San jose, CA (US); Craig Edward Uhrich, San Jose, CA (US); Brian Keith Hauser, San jose, CA (US); Chintang Yen, San jose, CA (US)

(73) Assignee: MGI Tech Co., Ltd., Shenzhen (CN)

( * ) Notice: Subject to any disclaimer, the term of this patent is extended or adjusted under 35 U.S.C. 154(b) by 166 days.

(21) Appl. No.: 17/798,786

(22) PCT Filed: Feb. 12, 2020

(86) PCT No.: PCT/CN2020/074795
§ 371 (c)(1),
(2) Date: Aug. 10, 2022

(87) PCT Pub. No.: WO2021/159285
PCT Pub. Date: Aug. 19, 2021

(65) Prior Publication Data
US 2023/0092006 A1 Mar. 23, 2023

(51) Int. Cl.
*G01N 21/64* (2006.01)
(52) U.S. Cl.
CPC ....... *G01N 21/6456* (2013.01); *G01N 21/645* (2013.01); *G01N 2021/6478* (2013.01)

(58) Field of Classification Search
None
See application file for complete search history.

(56) References Cited

U.S. PATENT DOCUMENTS 7,304,310 B1 * 12/2007 Shortt .................. G01N 21/94
250/372
8,351,675 B2 * 1/2013 So ...................... G02B 21/0048
382/133

(Continued)

FOREIGN PATENT DOCUMENTS

CA 2902356 A1 8/2014
CN 203759351 U * 8/2014

(Continued)

OTHER PUBLICATIONS

English Translation (Year: 2015).*
English Translation (Year: 2014).*

*Primary Examiner* — David P Porta
*Assistant Examiner* — Djura Malevic
(74) *Attorney, Agent, or Firm* — ScienBiziP, P.C.

(57) ABSTRACT

An optical imaging system (1) is configured for photographing a sample and includes a lighting module (11) and an imaging module (15). The lighting module (11) is configured for outputting excitation light, the excitation light is configured to excite the sample to generate excited light, the imaging module (15) comprises a time delay integration line scan camera (151), the time delay integration line scan camera (151) is configured to record the excited light. A biochemical substance detection system using the optical imaging system (1) is also provided, improving the detection flux.

17 Claims, 21 Drawing Sheets

(56) References Cited

U.S. PATENT DOCUMENTS

| | | | |
|---|---|---|---|
| 8,982,206 B2* | 3/2015 | Raicu | G01N 15/1433 348/79 |
| 9,041,930 B1* | 5/2015 | Young | G02B 7/28 356/419 |
| 9,057,879 B2* | 6/2015 | Knebel | G02B 21/361 |
| 9,383,563 B2* | 7/2016 | Hayashi | G02B 21/0072 |
| 9,384,864 B2* | 7/2016 | Nelson | G21K 4/00 |
| 9,448,343 B2* | 9/2016 | Kvamme | G01N 21/8806 |
| 9,496,425 B2* | 11/2016 | Chern | H01L 27/14685 |
| 9,696,264 B2* | 7/2017 | Lange | G01N 21/9501 |
| 9,818,887 B2* | 11/2017 | Chern | H01L 27/1464 |
| 10,121,914 B2* | 11/2018 | Chern | H01L 31/0216 |
| 10,139,608 B2* | 11/2018 | Huang | G02B 21/16 |
| 10,446,696 B2* | 10/2019 | Chern | H01L 27/14685 |
| 10,518,110 B1* | 12/2019 | Jimenez-Carvajal | A61N 5/1075 |
| 10,705,026 B2* | 7/2020 | Zeng | G01N 21/8806 |
| 10,739,276 B2* | 8/2020 | Pettibone | G01J 1/0437 |
| 10,758,748 B2* | 9/2020 | Chappelow | A61N 5/1045 |
| 10,823,686 B2* | 11/2020 | Urano | G01N 23/18 |
| 10,852,520 B2* | 12/2020 | Hillman | G02B 21/0032 |
| 10,884,227 B2* | 1/2021 | Tomer | G02B 21/0032 |
| 10,888,713 B2* | 1/2021 | Rieger | G21K 1/04 |
| 10,955,652 B2* | 3/2021 | Hillman | G02B 27/0927 |
| 11,022,788 B2* | 6/2021 | Fahrbach | G02B 21/16 |
| 11,065,472 B2* | 7/2021 | Ma | A61N 5/1048 |
| 11,077,322 B2* | 8/2021 | Yang | A61N 5/1067 |
| 11,173,326 B2* | 11/2021 | Yang | A61N 5/1049 |
| 11,243,115 B2* | 2/2022 | Arbore | G01J 3/0294 |
| 11,262,306 B2* | 3/2022 | Gao | G02B 21/16 |
| 11,320,640 B2* | 5/2022 | Keller | G02B 21/32 |
| 11,340,176 B2* | 5/2022 | Takeda | G01N 23/04 |
| 11,491,347 B2* | 11/2022 | Ma | A61N 5/1045 |
| 11,682,125 B2* | 6/2023 | Li | G06T 7/70 382/129 |
| 11,714,271 B2* | 8/2023 | Cang | G02B 27/106 250/459.1 |
| 11,730,977 B2* | 8/2023 | Stahl | A61N 5/1036 600/1 |
| 11,738,209 B2* | 8/2023 | Ma | G21K 1/046 378/151 |
| 11,878,185 B2* | 1/2024 | Duval | G21K 1/046 |
| 11,986,675 B2* | 5/2024 | Wösle | A61N 5/1047 |
| 2002/0028399 A1* | 3/2002 | Nakasuji | H01L 21/6719 430/30 |
| 2002/0036264 A1* | 3/2002 | Nakasuji | H01J 37/185 250/306 |
| 2002/0088940 A1* | 7/2002 | Watanabe | H01J 37/224 250/310 |
| 2002/0148975 A1* | 10/2002 | Kimba | H01J 37/073 250/492.1 |
| 2003/0151742 A1* | 8/2003 | Silvermintz | G02B 21/0024 356/417 |
| 2004/0248329 A1* | 12/2004 | Satake | H01L 21/67219 118/712 |
| 2005/0194535 A1* | 9/2005 | Noji | G06T 7/001 250/311 |
| 2006/0087953 A1* | 4/2006 | Tohyama | G11B 7/268 369/126 |
| 2008/0251718 A1* | 10/2008 | Kaga | H01J 37/28 250/310 |
| 2009/0026368 A1* | 1/2009 | Noji | H01J 37/045 250/310 |
| 2009/0050802 A1* | 2/2009 | Noji | H01J 37/265 250/307 |
| 2009/0090863 A1* | 4/2009 | Watanabe | G01N 23/2251 250/307 |
| 2010/0091101 A1* | 4/2010 | Fujimoto | G02B 21/02 348/79 |
| 2010/0264294 A1* | 10/2010 | Stallinga | G02B 21/004 250/201.3 |
| 2012/0074316 A1* | 3/2012 | Watanabe | H01J 37/29 250/307 |
| 2014/0226866 A1* | 8/2014 | Crandall | G01N 21/6428 382/107 |
| 2014/0312227 A1* | 10/2014 | Yoshikawa | H01J 37/023 250/310 |
| 2014/0361154 A1* | 12/2014 | Hayashi | G02B 27/58 250/234 |
| 2015/0029386 A1* | 1/2015 | Pitts | H04N 23/81 348/335 |
| 2015/0041645 A1* | 2/2015 | Iida | H01J 37/29 250/307 |
| 2016/0025645 A1* | 1/2016 | Huang | G01N 21/9501 356/237.2 |
| 2016/0363538 A1* | 12/2016 | Dutertre | G02B 21/16 |
| 2017/0302827 A1* | 10/2017 | Shimada | C12M 41/36 |
| 2017/0371136 A1* | 12/2017 | Shimada | G02B 21/0032 |
| 2018/0052314 A1* | 2/2018 | Brinkman | G02B 21/22 |
| 2018/0193671 A1* | 7/2018 | Chappelow | A61N 5/1045 |
| 2018/0314047 A1* | 11/2018 | Shimada | G02B 21/0076 |
| 2019/0271647 A1* | 9/2019 | Grabmayr | G01N 21/6428 |
| 2020/0033577 A1* | 1/2020 | Watanabe | G02B 9/14 |
| 2020/0041778 A1* | 2/2020 | Dholakia | G02B 21/086 |
| 2020/0078605 A1* | 3/2020 | Yang | A61N 5/1049 |
| 2020/0132608 A1* | 4/2020 | Chu | G01N 21/9501 |
| 2020/0142170 A1* | 5/2020 | Cai | G02B 21/0076 |
| 2021/0011266 A1* | 1/2021 | Hamilton | G02B 21/0076 |
| 2021/0019895 A1* | 1/2021 | Li | G06T 7/33 |
| 2021/0169336 A1* | 6/2021 | Sanchez | A61B 5/444 |
| 2021/0239955 A1* | 8/2021 | Dai | G01N 21/6458 |
| 2022/0007943 A1* | 1/2022 | Sanchez | A61B 5/0075 |
| 2022/0016633 A1* | 1/2022 | Cui | B01L 9/527 |
| 2022/0197002 A1* | 6/2022 | Cang | G02B 21/006 |
| 2022/0339632 A1* | 10/2022 | Xu | C12Q 1/6874 |
| 2023/0092006 A1* | 3/2023 | Jiang | G02B 21/0076 250/458.1 |

FOREIGN PATENT DOCUMENTS

| | | |
|---|---|---|
| CN | 104199176 A | 12/2014 |
| CN | 104967759 A * | 10/2015 |
| CN | 105039147 A | 11/2015 |
| CN | 106645045 A | 5/2017 |
| CN | 109283672 A | 1/2019 |
| CN | 110657953 A | 1/2020 |
| JP | S62125313 A | 6/1987 |
| JP | S63311222 A | 12/1988 |
| JP | H10326587 A | 12/1998 |
| JP | 2003075720 A | 3/2003 |
| JP | 2005202092 A | 7/2005 |
| JP | 2005241290 A | 9/2005 |
| JP | 2006003542 A | 1/2006 |
| JP | 2007502419 A | 2/2007 |
| JP | 2009537021 A | 10/2009 |
| JP | 2014115448 A | 6/2014 |
| JP | 2014142657 A | 8/2014 |
| JP | 2015513111 A | 4/2015 |

\* cited by examiner

OPTICAL IMAGING SYSTEM AND BIOCHEMICAL SUBSTANCE DETECTION SYSTEM USING SAME

FIELD

The subject matter relates to field of detection, and more particularly, to an optical imaging system and a biochemical substance detection system using the optical imaging system.

BACKGROUND

An optical imaging system of an imaging analysis instrument used in the field of biochemical substance analysis, such as a gene sequencer, is mostly designed based on a scientific area-array camera with high sensitivity. Since an area of an area to be measured of a sequencing chip is usually much larger than a single visible area of objective lens of the optical imaging system, it is necessary to use a manner of sequential scanning of multiple rows or columns to complete the photographing of areas to be detected of the entire sequencing chip. Splicing will be carried out in a data analysis stage.

A common scientific area-array camera usually uses a design scheme based on platform stepping when performing sequential scanning of multiple rows or columns. In other words, the platform is equipped with the sequencing chip and is moved to meet needs of taking photos at different positions. When the platform moves to a photographing location, the platform needs to slow down to a standstill before taking photos, otherwise a smear occurs in a photographed image. Thus, it is required that the platform must have the accelerate and decelerate ability to stop quickly from a high speed and resume moving at a high speed from a stationary state after taking photos. In the existing technology, the acceleration and deceleration of the platform take considerable time, and this presents one of the bottlenecks to high-throughput optical sequencing.

In addition, as the key component of the optical imaging system, the existing microscope objective usually cannot have both large field of view and large numerical aperture, so it is not suitable for high-throughput optical imaging system.

SUMMARY

To overcome at least a portion of the above shortcomings, an optical imaging system and a biochemical substance detection system using the optical imaging system are needed.

A first aspect provides an optical imaging system configured for photographing a sample. The optical imaging system includes a lighting module and an imaging module. The lighting module is configured for outputting excitation light, the excitation light is configured to excite the sample to generate excited light. The imaging module includes a time delay integration line scan camera, the time delay integration line scan camera is configured to record the excited light.

A second aspect provides a biochemical substance detection system including the above optical imaging system.

The optical imaging system provided and the biochemical substance detection system applying the optical imaging system in the embodiment of the disclosure achieve beneficial effects as follows: first, the industrial or scientific TDI camera is adopted to collect the excited light, which reduces the photographing time of each sample and improves the detection flux. Second, on the one hand, the excited light can be divided into multiple channels for imaging using the light filtering system composed of the light splitting device and the light filtering device, on the other hand, the interference of excitation light and other light, such as detection light, on the imaging of excited light is prevented, and the imaging quality is improved. Third, the output end face of the light source is a rectangle, or further a slender rectangle, and the excitation light output from the light source is shaped into an illumination spot suitable for the photosensitive surface of the TDI camera by the excitation light shaping unit, utilizing the light source energy to a large extent and improving the uniformity of the illumination spot. Fourth, the objective lens with special structure is adopted to enable a large field of view and a large numerical aperture, distortion and flat field achromatism being thereby reduced. Fifth, a focusing system is adopted, and the focusing system adjusts the distance between the objective lens and the sample carrier in real time, so that the sample carrier is kept on the focal plane of the objective lens, compensating for the change of distance between the sample carrier and the objective lens caused by a change of environmental temperature, mechanical vibration, sample flexing or other reasons, ensuring the imaging quality. Sixth, the focusing system adopts a specific method to calculate the distance between the sample carrier and the objective lens, which effectively eliminates the influence on the detection results of signal noise and a change of brightness of the detection light.

BRIEF DESCRIPTION OF THE DRAWINGS

Implementations of the present technology will now be described, by way of embodiment, with reference to the attached figures. Obviously, the drawings are only some embodiments of the present disclosure. For those of ordinary skill in the art, other drawings can be obtained based on these drawings without creative work.

Figure 1:
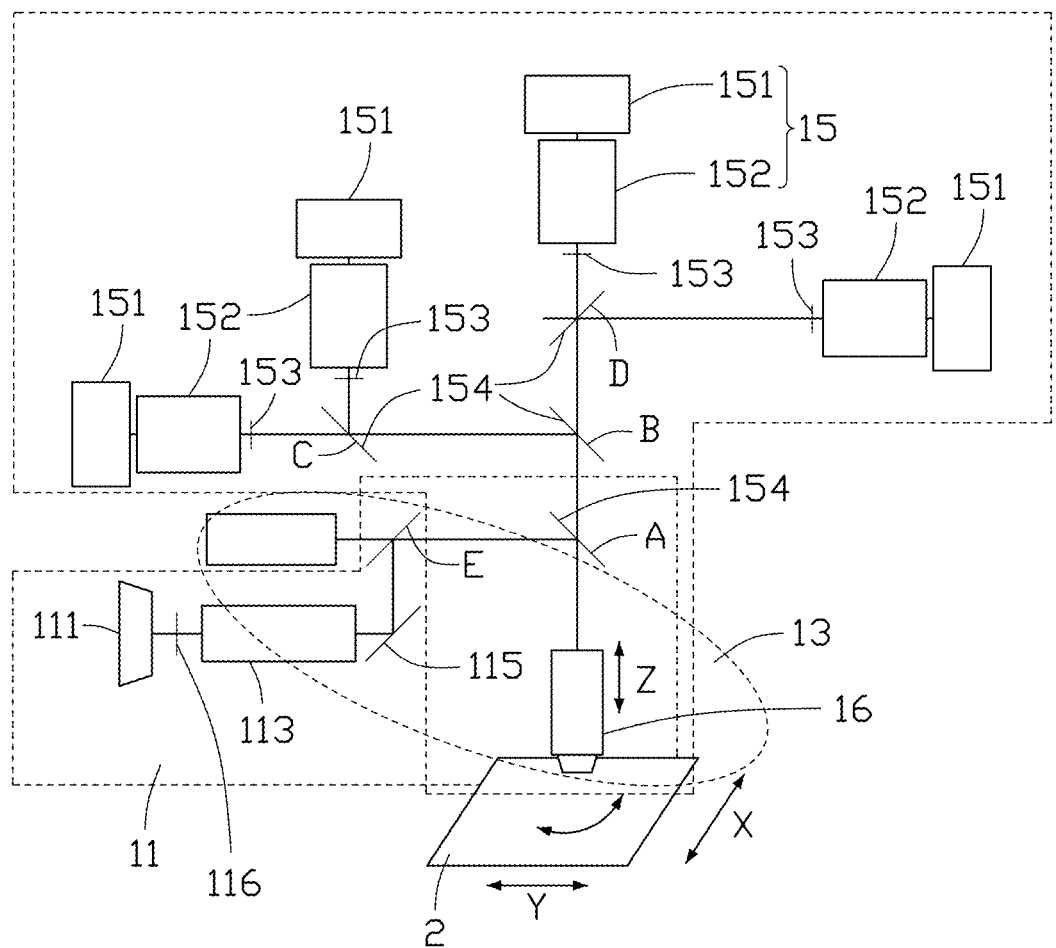
FIG. 1 is a schematic diagram of an optical imaging system according to an embodiment of the present disclosure.

Implementations of the disclosure will now be described, by way of embodiments only, with reference to the drawings.

SYMBOL DESCRIPTION OF MAIN COMPONENTS

Optical imaging system 1; lighting module 11; focusing module 13; imaging module 15; objective lens 16; light source 111, 1301; excitation light shaping unit 113; sample carrier 2; TDI camera 151; tube lens 152, 1303; cut-off filter 153, 116; light splitting device 154; dichroic mirror A, B, C, D, E; plane mirror 115; photographing time t1, t2; first group of lenses 161; second group of lenses 162; third group of lenses 163; fourth group of lenses 164; fifth group of lenses 165; sixth group of lenses 166; seventh group of lenses 167; first lens L1; second lens L2; third lens L3; fourth lens L4; fifth lens L5; sixth lens L6; seventh lens L7; eighth lens L8; ninth lens L9; tenth lens 10; eleventh lens L11; twelve lens L12; thirteen lens L13; fourteen L14; multimode fiber 1111; output end face 1112; first shaping unit 113a; second shaping unit 113b; cylindrical lens C1, C2, C3, C4; photosensitive surface 1511; control device 17; movable platform 18; computer device 19; detection light path 130; sensing unit 131; control unit 132; sensor 1311; speculum 1305; PD sensor 1312; sensing area 1312a, 1312b; curve O, P, Q, R; intersection point S; horizontal line H.

DETAILED DESCRIPTION

Implementations of the disclosure will now be described, by way of embodiments only, with reference to the drawings. The described embodiments are only some embodiments of the present disclosure, rather than all the embodiments. The disclosure is illustrative only, and changes may be made in the detail within the principles of the present disclosure. It will, thus, be appreciated that the embodiments may be modified within the scope of the claims.

It should be noted that when a component is referred to as being "fixed to" or "mounted on" another component, the component can be directly on another component or a middle component may exist therebetween. When a component is considered to be "arranged on" another component, the component can be directly on another component or a middle component may exist therebetween. The term "and/or" as used herein means any combinations of one or more related listed items.

FIG. 1 is a schematic diagram of an optical imaging system according to an embodiment of the present disclosure. The optical imaging system 1 includes a lighting module 11, a focusing module 13, and an imaging module 15. The imaging module 15 uses a time delay integration (TDI) line scan camera (hereinafter referred to as TDI camera) for imaging. Furthermore, the TDI camera is an industrial or scientific TDI camera. The lighting module 11, the focusing module 13, and the imaging module 15 share some light path guiding components and an objective lens 16. The lighting module 11 includes a light source 111 and an excitation shaping unit 113. Excitation light emitted by the light source 111 is shaped into linear light spot adapted to a photosensitive surface of the TDI camera by the excitation shaping unit 113. The linear light spot is guided to the objective lens 16 through light path guiding elements and is emitted to a sample carried on the sample carrier 2 through the objective lens 16. The sample is excited by the excitation light to generate excited light, the excited light enters the imaging module 15 through the objective lens and is recorded by the TDI camera in the imaging module 15. The focusing module 13 emits detection light, the detection light is guided into the objective lens 16 by the light path guiding components, and then emitted to the sample carrier 2 through the objective lens 16. The detection light will not excite the sample to generate the excited light, but will be reflected back into the objective lens 16 by the sample carrier 2. The detection light is guided into the focusing module 13 through the objective lens 16 and the light path guiding components. The focusing module 13 analyzes and determines a positional relationship between the sample carrier 2 and the objective lens 16 and adjusts a position of the objective lens 16 relative to the sample carrier 2 according to the determined positional relationship between the sample carrier 2 and the objective lens 16, so that the sample carrier 2 is always located on a focal plane of the objective lens 16.

In the embodiment, the light source 111 is a laser light source, and the excitation light is laser light. The optical imaging system 1 is a sequencing photography system, which is configured to take photos of DNA samples to analyze base sequences of DNA samples.

The DNA samples are carried on the sample carrier 2. Four types of bases A, T, G, and C of the DNA sample are labeled with different fluorescent dyes respectively. The laser light emitted from the objective lens 16 excites the DNA samples to emit four kinds of fluorescence of different wavelengths. The imaging module 15 includes four TDI cameras 151. The arrangement of the four TDI cameras 151 gives the optical imaging system 1 four imaging channels. In front of each TDI camera 151, a tube lens 152 and a cut-off filter 153 are arranged. Each cut-off filter 153 only allows fluorescence in one wavelength range to enter a corresponding TDI camera 151, so that the corresponding TDI camera 151 records only a fluorescence signal emitted by one type of the bases A, T, G, and C. The imaging module 15 also includes a plurality of light splitting devices 154. The light splitting devices 154 guide light of different wavelengths into different imaging channels by reflecting the light of one wavelength range and transmitting the light of another wavelength range, so that the light of different wavelengths is recorded by different TDI cameras 151. In the embodiment, the light splitting devices 154 are dichroic mirrors, and the imaging module 15 includes dichroic mirrors A, B, C, and D. The dichroic mirror A is arranged to correspond to the objective lens 16, and forms an angle of 45° with an optical axis of the objective lens 16, and is configured to transmit the excited light and reflect excitation light and detection light. The dichroic mirror B is arranged at a rear side of the dichroic mirror A, is arranged in parallel with the dichroic mirror A, and is configured to guide the excited light of different wavelengths to the dichroic mirrors C and D through transmission and reflection. The dichroic mirrors C and D then guide the excited light with different wavelengths to different cut-off filters 153 through transmission and reflection, then the excited light enters the corresponding TDI camera 151 through the tube lens 152.

In the embodiment, the lighting module 11 and the focusing module 13 share the dichroic mirror A of the imaging module 15. In addition, the lighting module 11 and the focusing module 13 also share a dichroic mirror E. The dichroic mirror E guides the excitation light and detection light incident from different angles to the dichroic mirror A, then the excitation light and detection light is guided into the objective lens 16 by the dichroic mirror A. The lighting module 11 also includes a plane mirror 115, the plane mirror 115 reflects the excitation light shaped by the excitation light shaping unit 113 to the dichroic mirror E.

Figure 2:
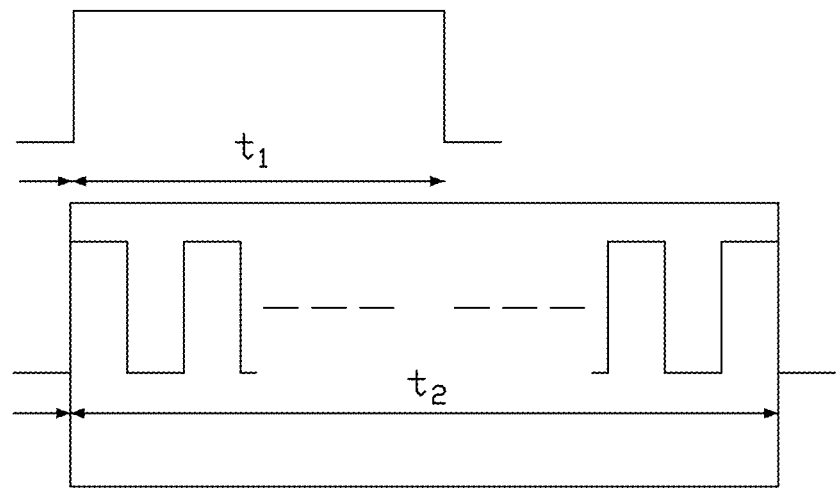
FIG. 2 is a schematic diagram showing photographing time per row as a comparison between a TDI camera and a traditional area-array camera.

In the embodiment, the TDI camera 151 is used. Multiple rows of pixels of a photosensitive chip of the TDI camera 151 can perform charge transfer row by row to image the same target for multiple exposures. By synchronizing the TDI camera 151 with the sample carrier 2, photographing time of each sample can be significantly reduced, and detection flux can be improved. FIG. 2 shows photographing time per row as a comparison between the TDI camera 151 and the traditional area-array camera. In FIG. 2, T1 represents the photographing time for each row of the TDI camera 151, and T2 represents the photographing time for each row of the traditional area-array camera. When scanning each row of the sample, a detection platform carrying the sample carrier 2 can be controlled to move at a constant speed, so that the TDI camera 151 can continuously scan the same row of the sample to collect image information of such row. Compared with the traditional sequencing, in which acceleration and deceleration of the detection platform are required when using the area-array camera to scan each field of view of each row, the detection platform with the TDI camera 151 only needs to be driven to accelerate or decelerate once when the row is changed, which improves time utilization of the optical imaging system 1, improves the detection flux of the biochemical substance detection device applying the optical imaging system 1, and avoids risks caused by frequent acceleration or deceleration of the detection platform.

In the embodiment, on the one hand, the objective lens 16 homogenizes and transmits rectangular line spot from the lighting module 11 to the sample carrier 2, and also guides the detection light from the focusing module 13 to the sample carrier 2. On the other hand, the objective lens 16 collects the excited light, the collected excited light passes through the tube lens 152, so as to obtain DNA fluorescence images of each channel on each TDI camera 151.

Since a spacing between sample sites on the sample carrier 2 is in a hundred nanometer scale, a numerical aperture NA of the objective lens 16 is required to be greater than 0.8 according to Rayleigh Criterion. In addition, for a high-throughput imaging systems, an effective field of view for imaging is a narrow rectangular region with a large length-width ratio, so that the TDI camera 151 needs a large linear field of view for imaging. For example, for a sequencing flux requirement of 6T/day, an object diameter field of view of the objective lens 16 is required to be more than 1.5 mm. Moreover, in order to achieve ultra-high throughput, the objective lens 16 needs to have a large numerical aperture and a large field of view at the same time. However, in current commercial microscopes, the low magnification objective lens usually has a large field of view but a small numerical aperture, while the high magnification objective lens has a large numerical aperture but a small field of view; generally, the product of the two is less than 0.8, so ultra-high throughput is difficult to achieve.

Thus, the objective lens 16 provided by the embodiment is to meet the following specifications:

The numerical aperture NA is greater than or equal to 0.7, an effective working distance is greater than 1.2 mm, a focal length is greater than 2.5 mm, an apochromatic aberration of 500 nm to 800 nm wavelength light wave is less than 0.4 um; a field curve is less than 0.4 um, an object field of view is greater than $\varphi$ 1.2 mm, and a distortion when combined with the tube lens is less than 1%.

In general, the objective lens 16 provided in the embodiment is a flat-field achromatic objective lens with large field of view, large numerical aperture, and small distortion, and is suitable for a 0.25 mm cover glass and a 0.05 mm water layer.

Figure 3:
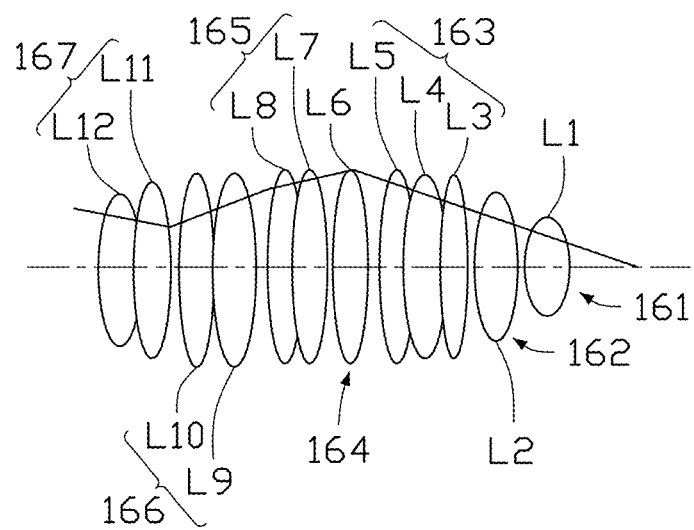
FIG. 3 is a schematic diagram of an objective lens according to an embodiment of the present disclosure.

FIG. 3 is a schematic diagram of the objective lens 16 according to the embodiment.

The objective lens 16 includes seven groups of lenses 161 to 167. First group of lenses 161 to seventh group 167 are arranged successively from an object side to an image side, in which the first three groups of lenses 161 to 163 bear a negative power, and the last four groups of lenses 164 to 167 bear a positive power. The first group of lenses 161 includes a first lens L1, which is a thick meniscus lens with a positive power, forming an aplanatic lens and generating a positive field curvature. A second group of lenses 162 includes a second lens L2, which is a crescent lens with a positive power and bears a positive deflection angle with the first lens L1. A third group of lenses 163 includes a third lens L3, a fourth lens L4, and a fifth lens L5. The third lens L3, the fourth lens L4, and the fifth lens L5 are glued together successively to form a triple cemented lens group with a positive power, which is mainly configured to correct comatic aberration and chromatic aberration. A fourth group of lenses 164 includes a sixth lens L6, which is a thin crescent lens with a positive power. A fifth group of lenses 165 includes a seventh lens L7 and an eighth lens L8. The seventh lens L7 and the eighth lens L8 are glued together to form a double cemented lens group with a positive power. A sixth group of lenses 166 includes a ninth lens L9 and a tenth lens L10. The ninth lens L9 and the tenth lens L10 are glued together to form a double cemented lens group with a negative power. The seventh group of lenses 167 includes an eleventh lens L11 and a twelfth lens L12. The eleventh lens L11 and the twelfth lens L12 are glued together to form a double cemented meniscus-negative lens group with a negative power. The sixth group of lenses 166 and the seventh group of lenses 167 are configured to control a field curvature and distortion.

In the embodiment, thicknesses of the thick meniscus lens, the meniscus lens, and the thin meniscus lens along an optical axis decrease successively. That is, a thickness of the thick meniscus lens along the optical axis is greater than that of the meniscus lens, and a thickness of the meniscus lens along the optical axis is greater than that of the thin meniscus lens. The terms "thick" and "thin" in the embodiment are relative and are only used for a description of a thickness of an object.

The first group of lenses 161 meets: $9.2<f1/fobj<9.7$;
The second group of lenses 162 meets: $4.7<f2/fobj<5.5$;
The third group of lenses 163 meets: $4.6<f3/fobj<5.6$;
The fourth group of lenses 164 meets: $3.25<f4/fobj<3.88$;
The fifth group of lenses 165 meets: $5.71<f5/fobj<6.11$;
The sixth group of lenses 166 meets: $-4.76<f6/fobj<-3$;
The seventh group of lenses 167 meets: $-23.9<f7/fobj<-19.5$.

Wherein, f1 is a focal length of the first group of lenses 161, f2 is a focal length of the second group of lenses 162, f3 is a focal length of the third group of lenses 163, f4 is a focal length of the fourth group of lenses 164, f5 is a focal length of the fifth group of lenses 165, f6 is a focal length of the sixth group of lenses 166, f7 is a focal length of the seventh group of lenses 167, and fobj is a focal length of the objective lens 16.

Figure 4:
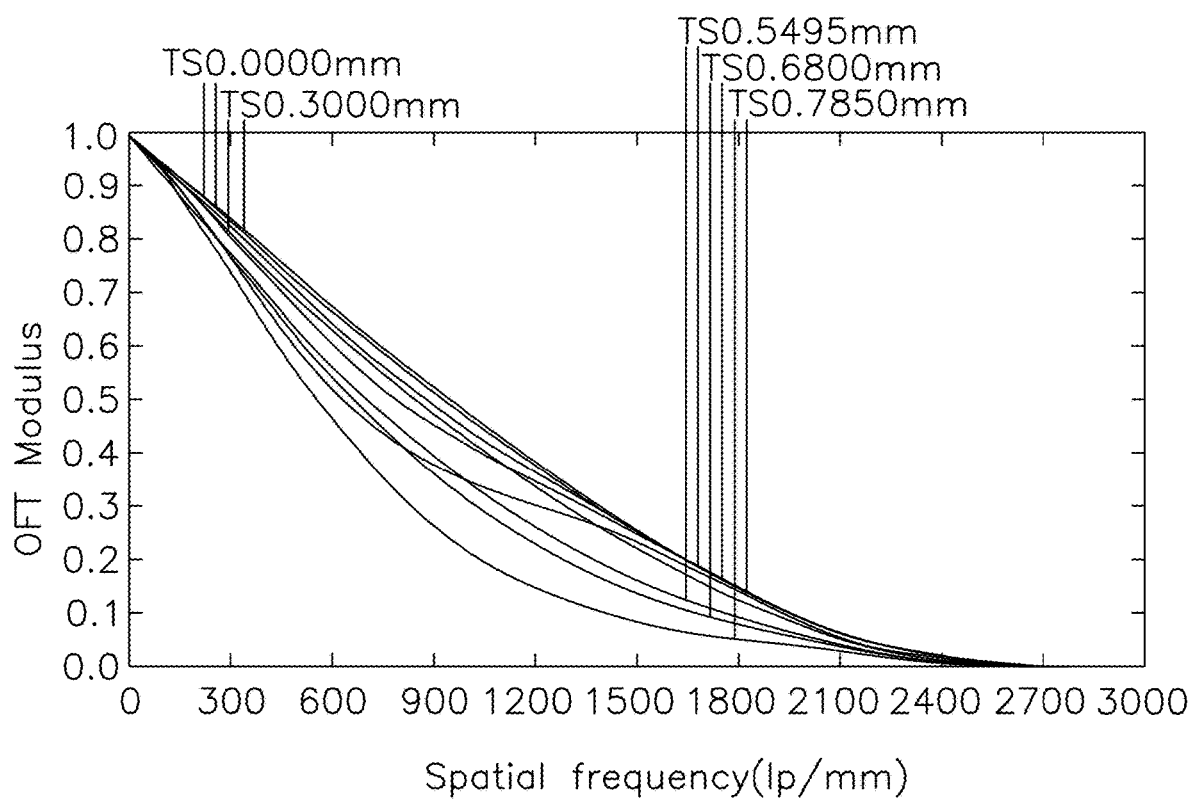
FIG. 4 is a full field and full band MTF curve of the objective lens of FIG. 3.
Figure 5:
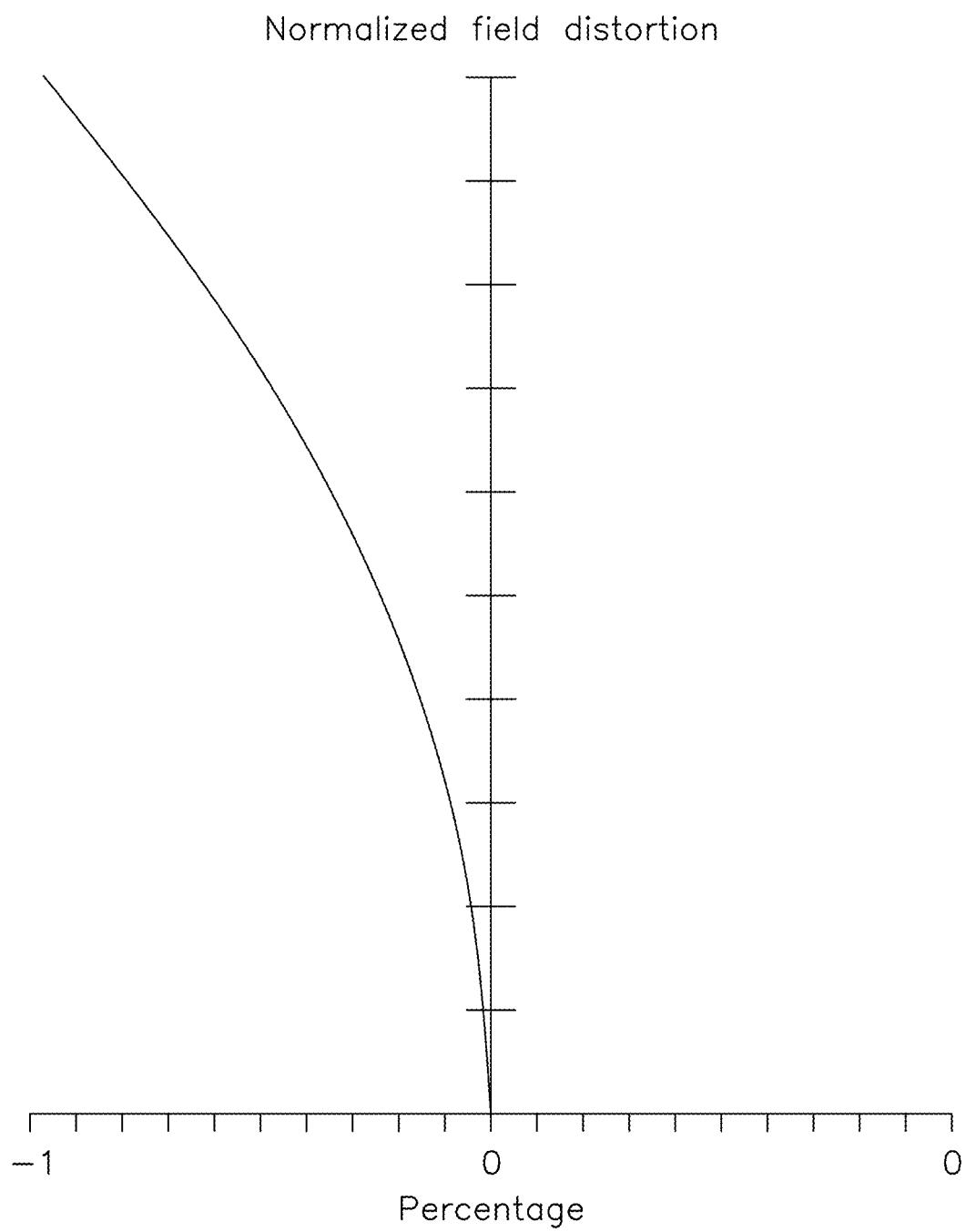
FIG. 5 is a distortion curve of the objective lens of FIG. 3.
Figure 6:
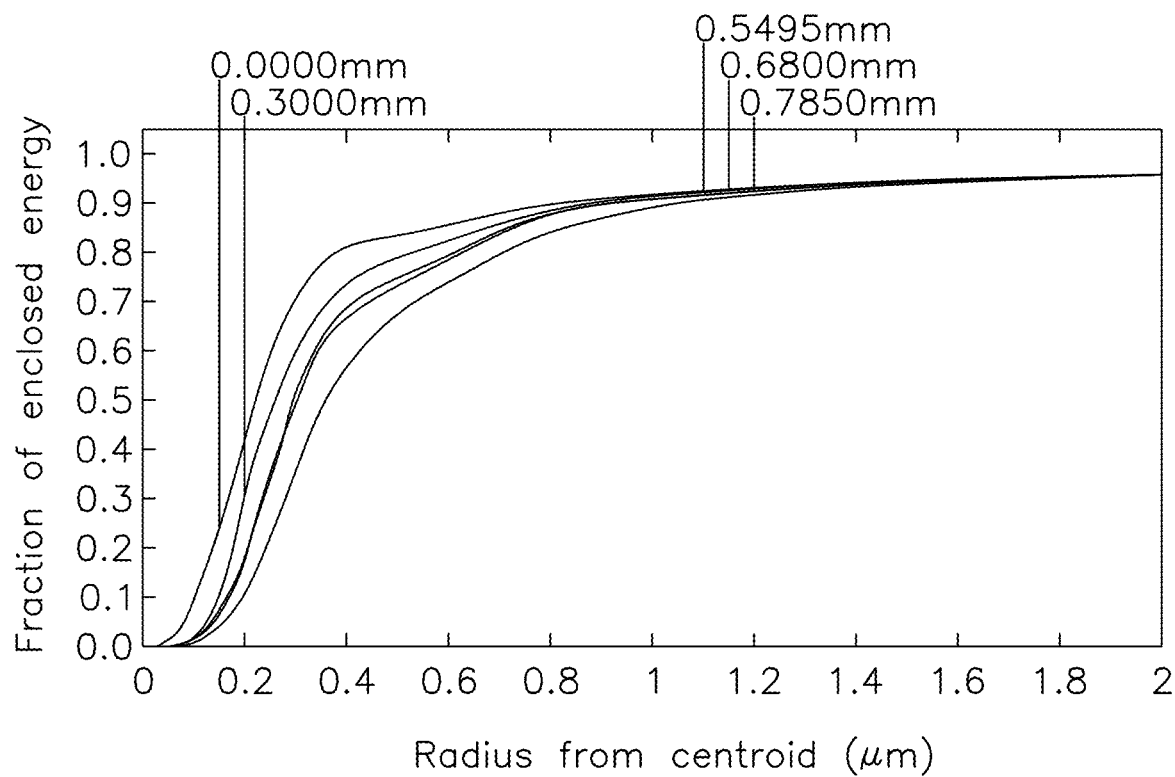
FIG. 6 is an envelope energy diagram of the objective lens of FIG. 3.

FIG. 4 shows a full field and full band MTF (Modulation Transfer Function) curve of the objective lens 16, FIG. 5 shows a distortion curve of the objective lens 16 obtained by simulation, and FIG. 6 shows an envelope energy diagram of the objective lens 16 obtained by simulation. From the above simulation results, it can be seen that the objective lens 16 is close to the diffraction limit in imaging results, and its normalized field distortion is less than 1% with high resolution.

Figure 7:
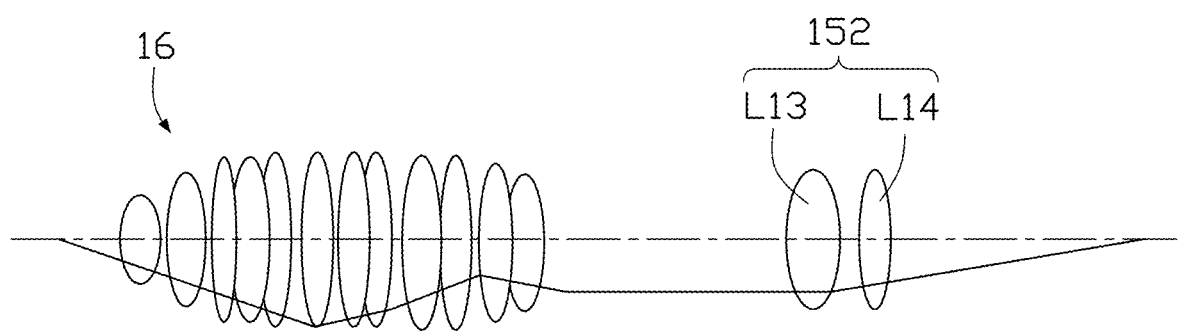
FIG. 7 is a schematic diagram of a combination of a tube lens and the objective lens of FIG. 3 according to an embodiment of the present disclosure.
Figure 8A:
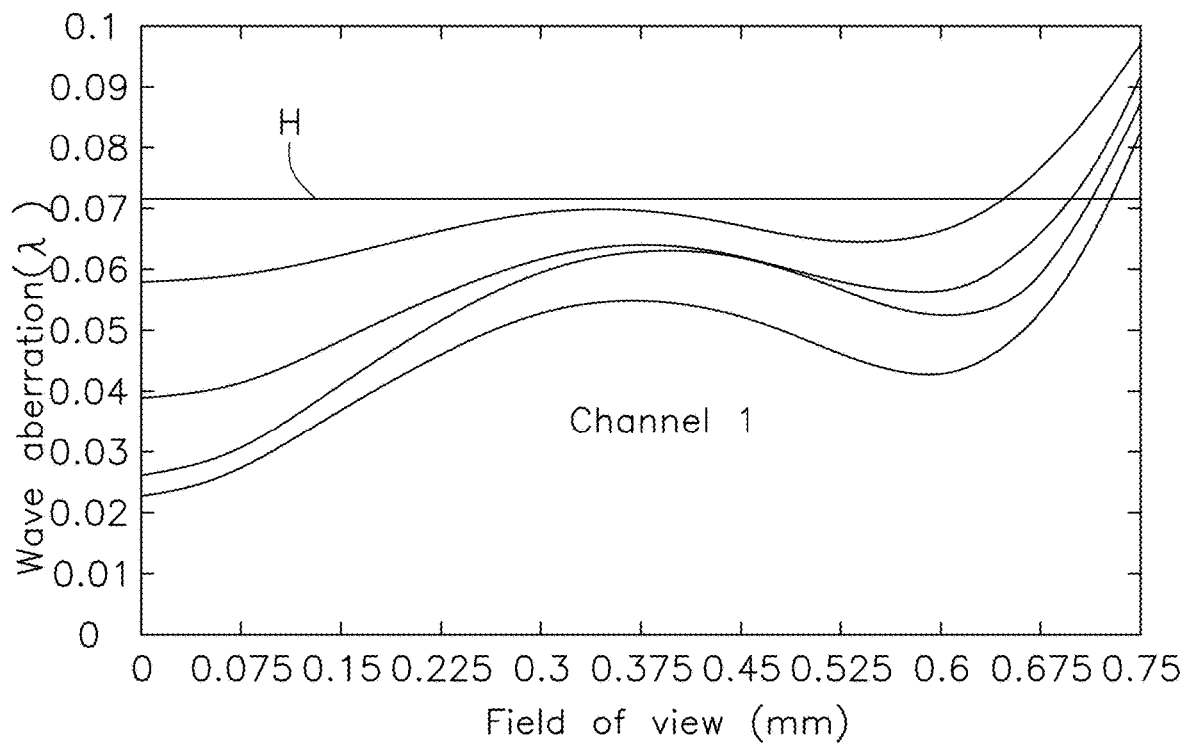
FIGS. 8A to 8D are wavefront difference curves of the combination of the objective lens and the tube lens shown in FIG. 7 in imaging channels 1 to 4.
Figure 8B:
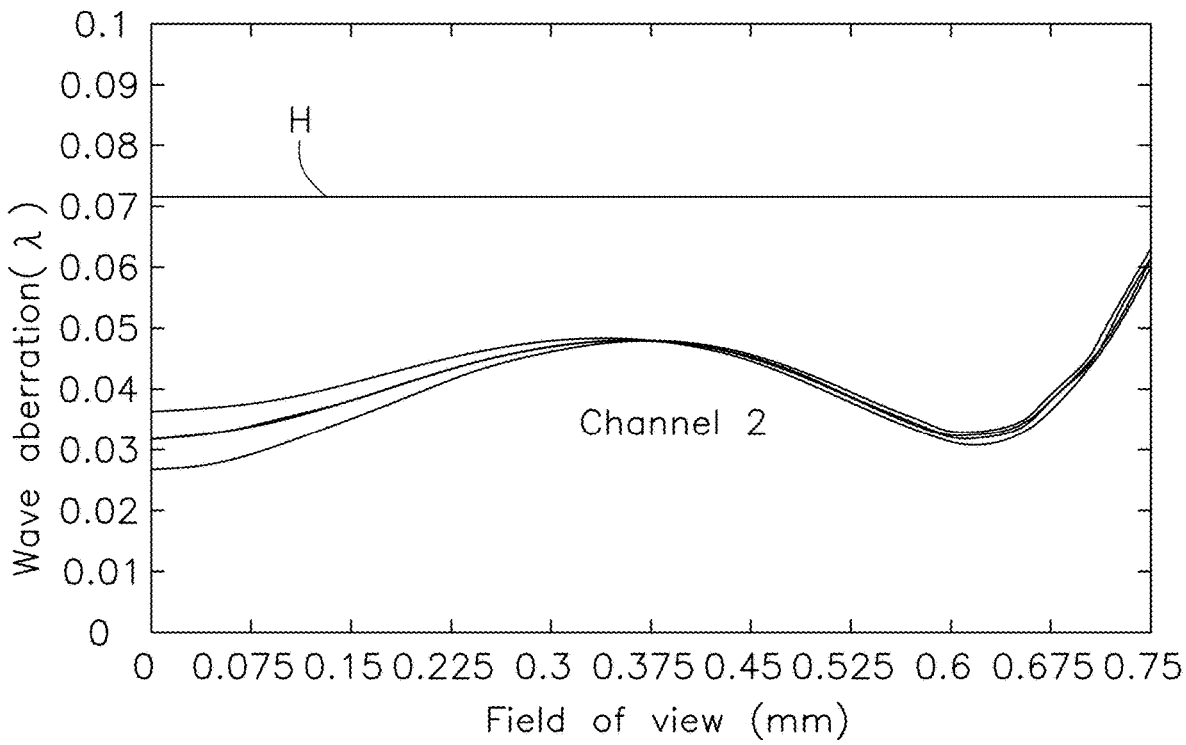
Figure 8C:
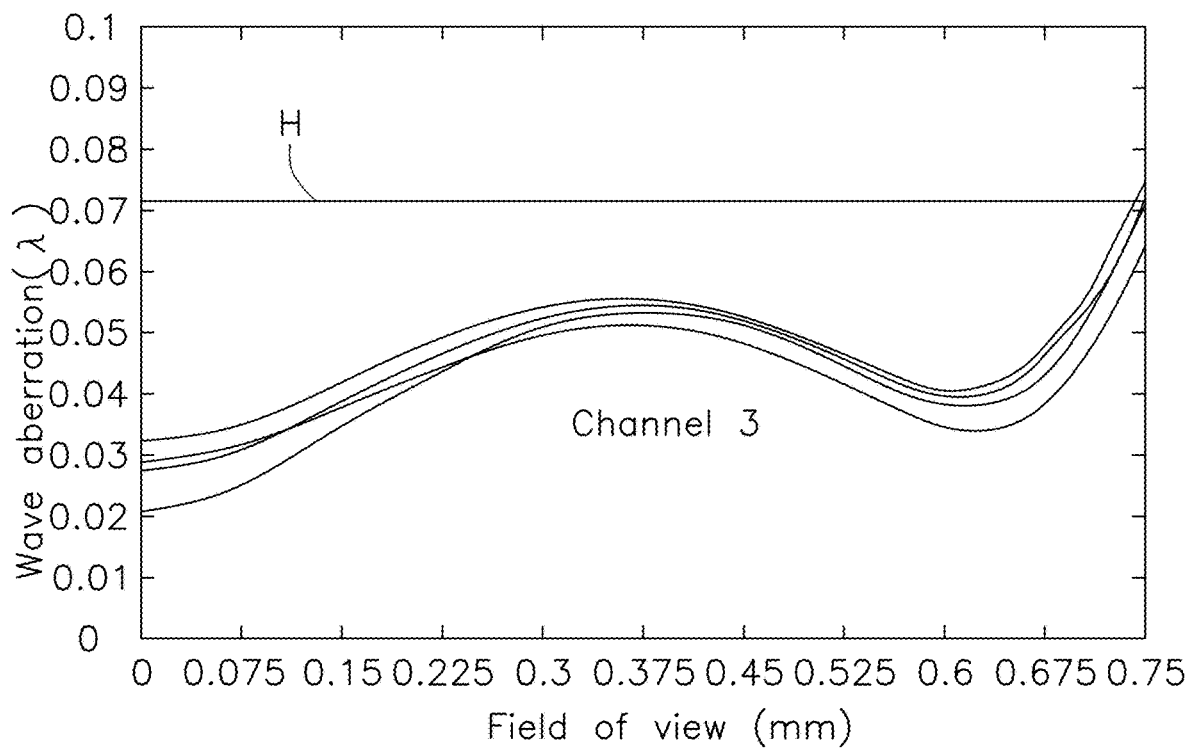
Figure 8D:
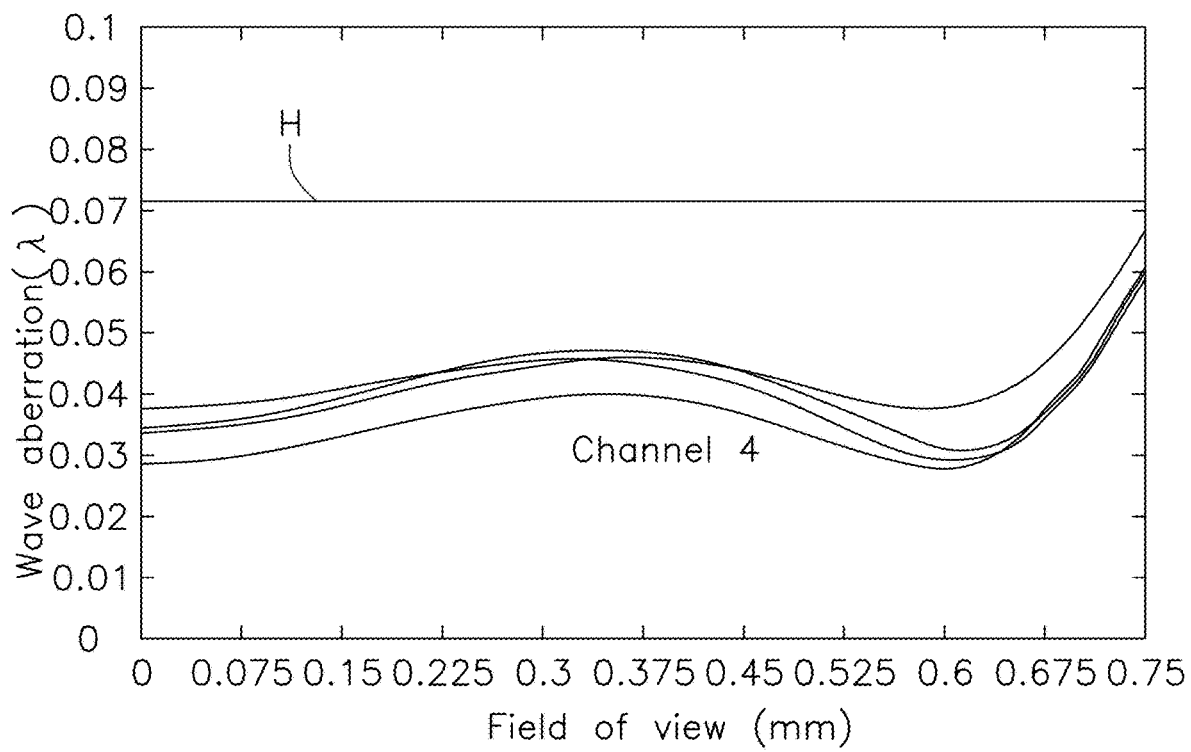

FIG. 7 is a schematic diagram of a combination of the objective lens 16 and the tube lens 152 according to the embodiment. In the embodiment, the tube lens 152 includes four lenses, which are glued together to form two double cemented lenses, hereinafter referred to as a thirteenth lens L13 and a fourteenth lens L14. A focal length of the tube lens 152 is 150 mm to 250 mm. In specific applications, a specific focal length value of the tube lens 152 is set according to the focal length of the objective lens 16, a pixel size and number of the TDI camera 151, and the magnification and resolution required by the optical imaging system 1. The combination of the tube lens 152 and the objective lens 16 needs to meet imaging restrictions such as distortion and a field curvature, and the tube lens 152 compensates for the residual aberration of the objective lens 16.

Figure 9:
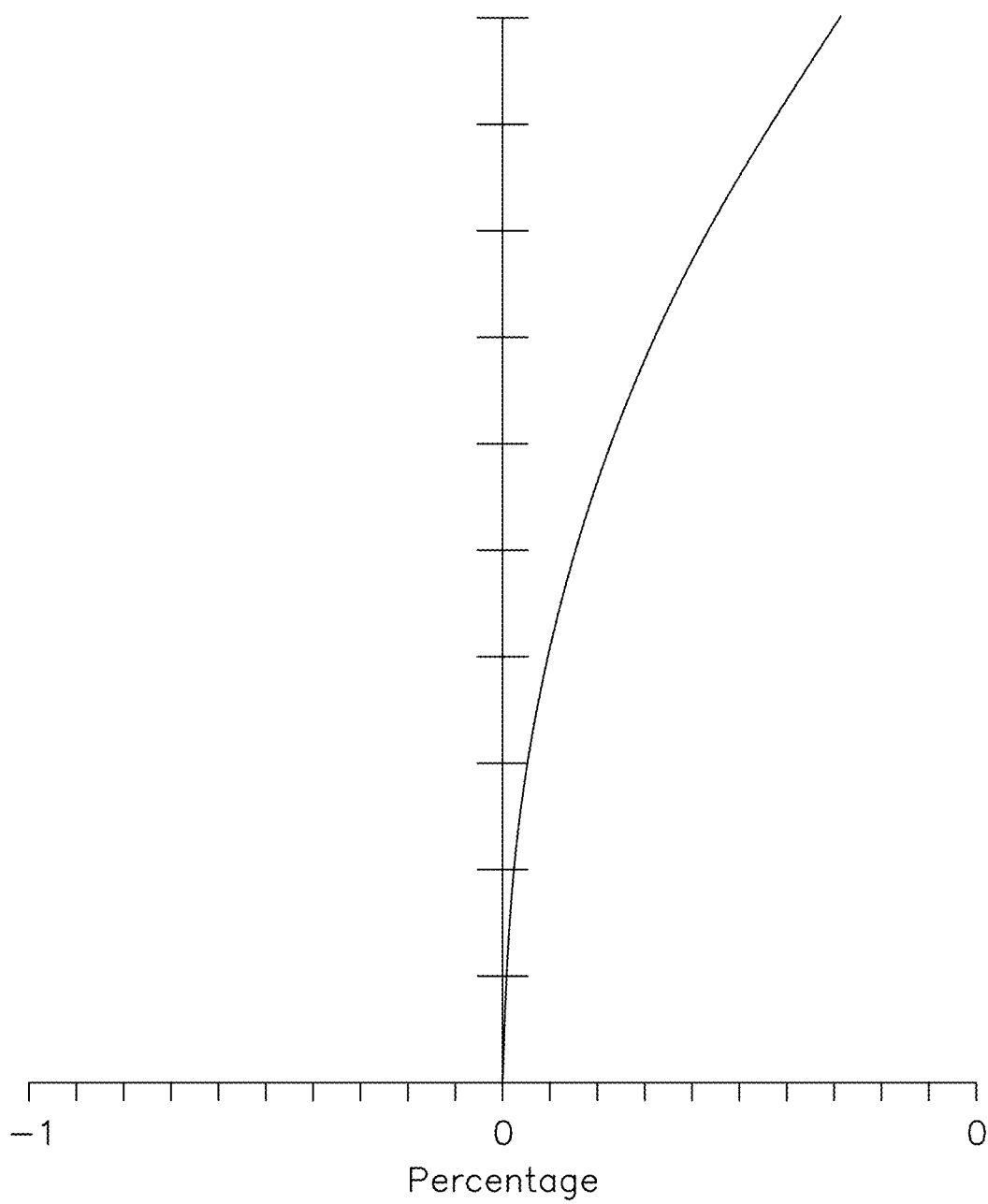
FIG. 9 is a distortion curve of the combination of the objective lens and the tube lens barrel lens shown in FIG. 7.

FIGS. 8A to 8D are wavefront aberration curves of the combination of the objective lens 16 and the tube lens 152 obtained by simulation in imaging channels 1 to 4, and FIG. 9 is a distortion curve of the combination of the objective lens 16 and the tube lens 152 obtained by simulation. A horizontal line H in FIGS. 8A to 8D represents the diffraction limit. The wave aberration of the combination of the objective lens 16 and the tube lens 152 in imaging channels 1 to 4 is lower than the horizontal line H, which proves that the combination of the objective lens 16 and the tube lens 152 has reached the limit of resolution requirements. As can be seen from FIG. 9, the normalized field distortion of the combination of the objective lens 16 and the tube lens 152 is less than 1%.

In the embodiment, the objective lens 16 is an infinity correction objective lens, and the objective lens 16 changes the received excited light emitted by the sample into a parallel light or similar parallel light. In this way, it is convenient to add a light splitting device 154 between the objective lens 16 and the tube lens 152 as needed.

Figure 10:
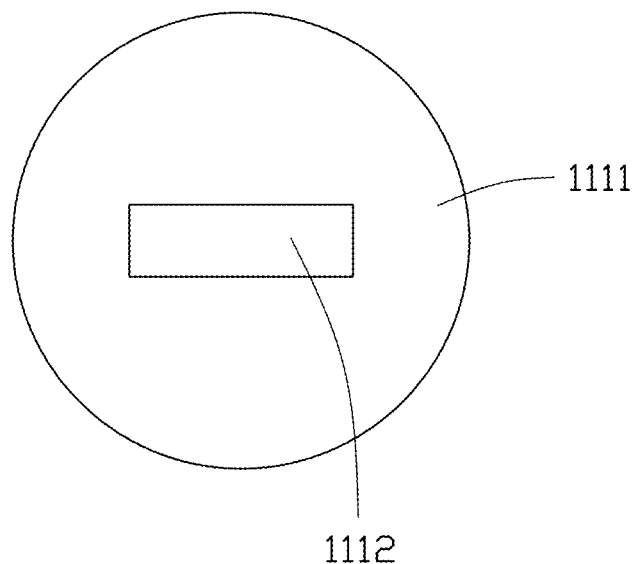
FIG. 10 is a schematic diagram of an output end face of a light source according to an embodiment of the present disclosure.

FIG. 10 is a schematic diagram of an output end face of the light source 111 of the embodiment. In the embodiment, the light source 111 is a laser light source that emits red and green laser light. The light source includes an optical fiber coupler (not shown) and a multimode optical fiber 1111. The red and green laser light is coupled to the multimode fiber 1111 through the fiber coupler for output. The multimode fiber 1111 has an output end face 1112, which is the output end face of the light source 111. In the embodiment, the output end face 1112 is rectangular to match a long strip-shaped photosensitive surface of the TDI camera 151. Thus, compared with a circular output end face commonly used in the prior art, the rectangular output end face of the light source 111 can be adapted to the TDI camera 151, which can improve the utilization of excitation light.

Figure 11:
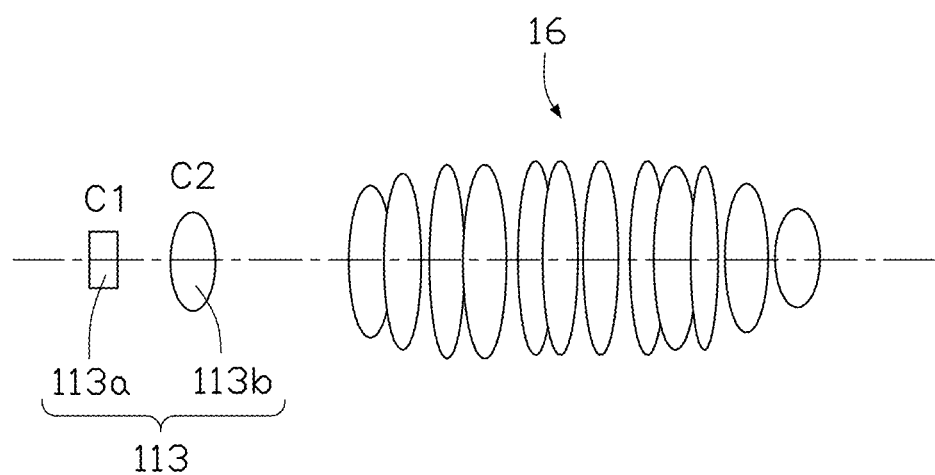
FIG. 11 is a schematic diagram of a combination of an excitation light shaping unit and the objective lens of FIG. 3 according to an embodiment of the present disclosure.

FIG. 11 is a schematic diagram of a combination of an excitation light shaping unit 113 and the objective lens 16 according to an embodiment. The excitation light shaping unit 113 includes a first shaping unit 113a and a second shaping unit 113b. The first shaping unit 113a and the second shaping unit 113b are arranged successively from the image side to the object side. The first shaping unit 113a is configured to shape rectangular light spot emitted by the light source 111 in a first direction, and the second shaping unit 113b is configured to shape an illumination spot emitted by the light source 111 in a second direction, the first direction and the second direction being perpendicular to each other. After the illumination spot is shaped by the first shaping unit 113a and the second shaping unit 113b, a linear spot with a length-width ratio required for imaging scan with the TDI camera 151 is formed. In the embodiment, the first shaping unit 113a and the second shaping unit 113b are cylindrical lenses C1 and C2 respectively. The cylindrical lens C1 enlarges the illumination spot in the X direction shown in FIG. 1, and the cylindrical lens C2 reduces the illumination spot in the Y direction shown in FIG. 1, so that the illumination spot finally forms the length-width ratio required for an imaging scan of the TDI camera 151. By selecting reasonable focal lengths of the cylindrical lenses C1 and C2, the length-width ratio of the illumination spot output by the lighting module 11 can be adjusted. In the embodiment, the cylindrical lenses C1 and C2 can realize the shaping of the length-width ratio of the illumination spot of 10:1, and multiply the rectangular output end face 1112 of the optical fiber 1111, so that the length-width ratio of the illumination spot output by the lighting module 11 can reach about 20:1. In the embodiment, two cylindrical lenses C1 and C2 are used to realize the shaping of the illumination spot. On the one hand, due to the use of fewer shaping elements, the excitation shaping unit 113 has a simple structure and is easy to assemble and adjust. On the other hand, the deviation of illumination spot caused by the component itself and assembly tolerance can be reduced. In addition, in the embodiment, critical illumination is used to strictly control the linear uniformity of illumination, and uniform illumination is provided for the excited light while maximizing the energy of the light source 111.

Figure 12:
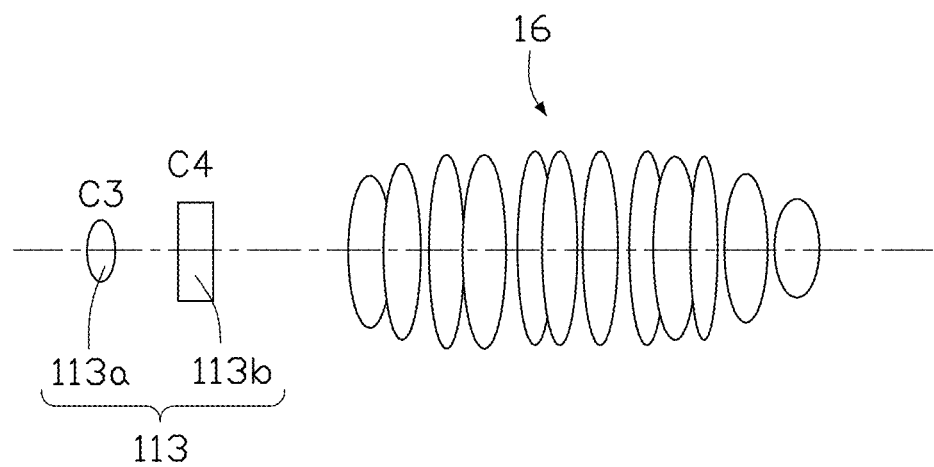
FIG. 12 is a schematic diagram of a combination of the excitation light shaping unit and the objective lens of FIG. 3 according to another embodiment of the present disclosure.

FIG. 12 is a schematic diagram of a combination of an excitation light shaping unit 113 and the objective lens 16 according to another embodiment. Different from the previous embodiment, in this embodiment, the first shaping unit 113a and the second shaping unit 113b are cylindrical lenses C3 and C4 respectively. The cylindrical lens C3 reduces the illumination spot in the Y direction shown in FIG. 1, and the cylindrical lens C4 enlarges the illumination spot in the X direction shown in FIG. 1, so that the illumination spot finally forms the length-width ratio required for the imaging scan of the TDI camera 151.

Figure 13:
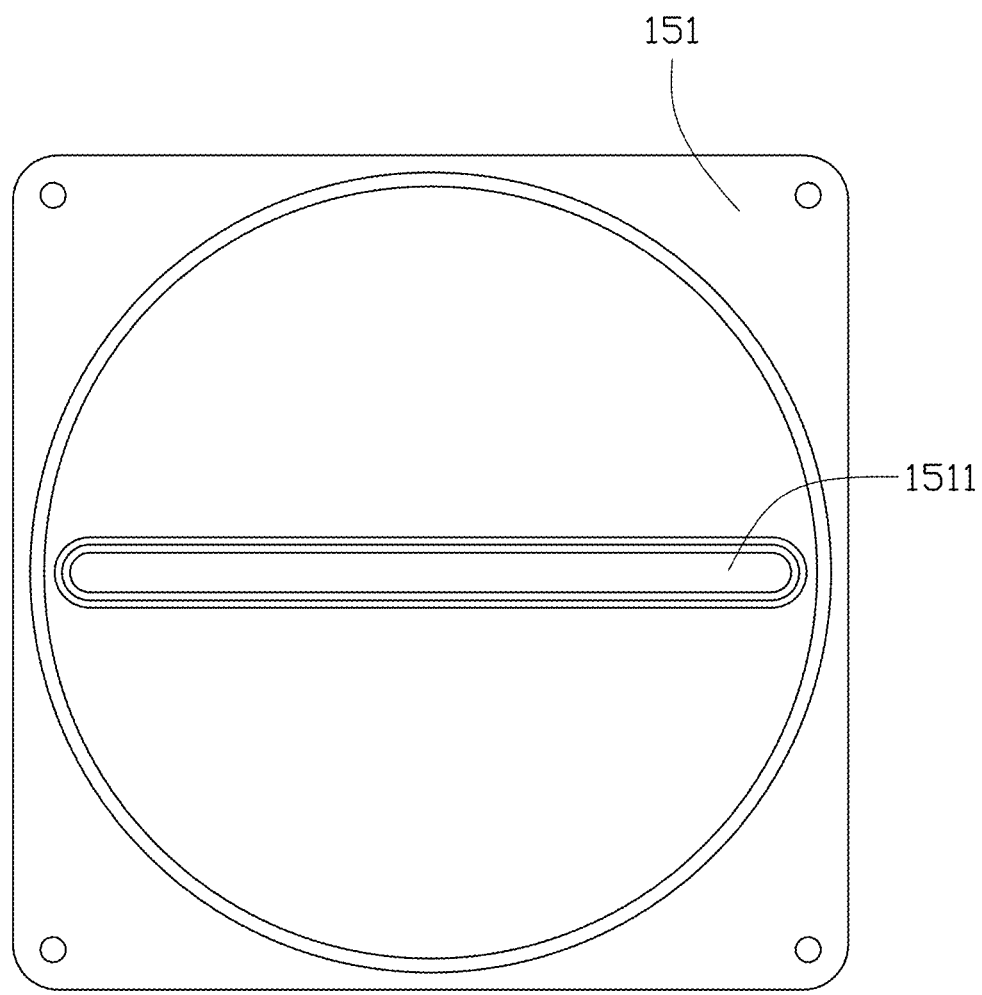
FIG. 13 is a schematic diagram of a photosensitive surface of the TDI camera according to an embodiment of the present disclosure.
Figure 14:
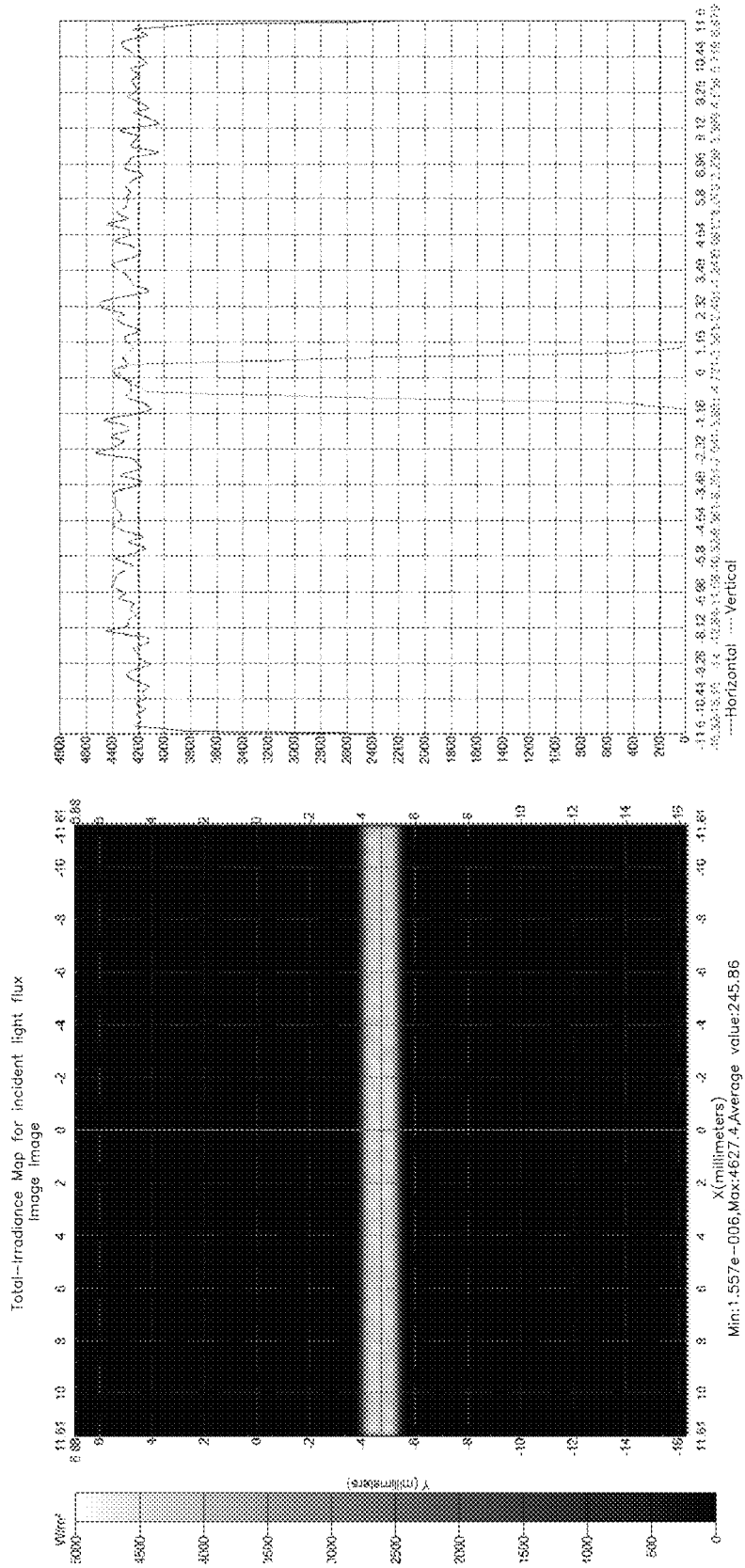
FIG. 14 is an irradiance map of an image plane obtained by simulation.

FIG. 13 is a schematic diagram of a photosensitive surface of the TDI camera 151 in the embodiment. The photosensitive surface 1511 of the TDI camera 151 is a rectangular surface, or further a long strip-shaped surface. FIG. 14 is an irradiance map of an image plan obtained by simulation. Specifically, FIG. 14 shows an irradiance map of an image plan obtained by simulating the optical imaging system 1 with a non-sequential simulation software. In the simulation, an input power of the light source 111 is normalized to 1 W, the dichroic mirrors A to E are simplified to beam splitters with a reflection/projection of 50/50, and transmittance of all lenses is assumed to be 100%. It can be seen from the irradiance map of image plan that the uniformity of illuminance of image plane is greater than 85%.

In other embodiments, the first shaping unit 113a and the second shaping unit 113b may also be optical wedges, microlenses, diffractive optical elements, etc.

Referring to FIG. 1 again, in the embodiment, a cut-off filter 153 is arranged before each barrel mirror 152. In addition, a cut-off filter 116 is arranged between the light source 111 and the excitation light shaping unit 113 to filter out stray light beyond the excitation wavelength. The cut-off filters 153 and 116 and the dichroic mirrors A to E constitute a filter system, so that four kinds of excited light are imaged through four channels and collected by four TDI cameras 151. On the one hand, the filter system realizes the division of the excited light into various channels for imaging. On the other hand, the filter system also filters the excitation and detection light out of the TDI camera 151. In the embodiment, the rejection rate of the cut-off filter 153 is 8.

Figure 15:
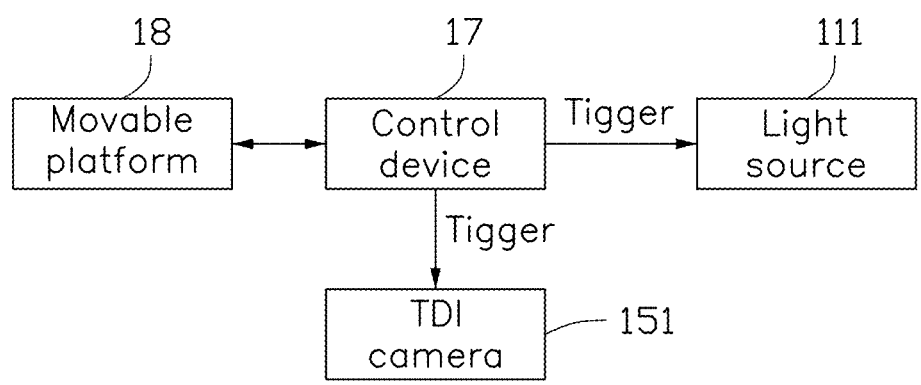
FIG. 15 is a control schematic diagram of the optical imaging system of FIG. 1.

FIG. 15 is a control schematic diagram of the optical imaging system 1 in the embodiment. The optical imaging system 1 also includes a control device 17. The control device 17 is configured to control a moving speed of the detection platform (which is the movable platform 17 in the embodiment) to match and keep synchronized with a frequency of the TDI camera 151. At the same time, the control device 17 is also configured to control switch-on of the light source 111 to keep synchronized with the photographing by the TDI camera 151. Specifically, in the embodiment, in order to achieve the above purpose, the control device 17 is communicatively coupled to the movable platform 18 on which the sample carrier 2 is placed. When the movable platform 18 reaches a specified position, the control device 17 triggers the light source 111 and the TDI camera 151 at the same time to synchronize in relation to the sample, the light source 111, and the TDI camera 151. At the same time, the frequency of the TDI camera 151 automatically matches the moving speed of the movable platform 18, so that the photographed image is not deformed. Referring to FIG. 1, the movable platform 18 can be controlled to move in the X direction and the Y direction perpendicular to the X direction, and can be controlled to rotate in a plane formed by the X direction and the Y direction, so that the movable platform 18 can be moved or positioned to a preset position. The objective lens 16 can be controlled to move in the Z direction shown in the figures. The Z direction is perpendicular to both the X direction and the Y direction.

In the embodiment, the focusing module 13 is configured to emit detection light to detect a positional relationship between the sample carrier 2 and the objective lens 16, and is configured to control the objective lens 16 to move in the Z direction according to detection results to adjust a distance between the objective lens 16 and the sample carrier 2, so that the sample carrier 2 is always on the focal plane of the objective lens 16. Thus, the focusing module 13 can compensate for change of a distance between the objective lens 16 and the sample carrier 2 caused by change of ambient temperature, mechanical vibration, flexing of the sample carrier 2, undulation in surface flatness of the sample carrier 2, or change of thickness of the sample carrier 2.

Figure 16:
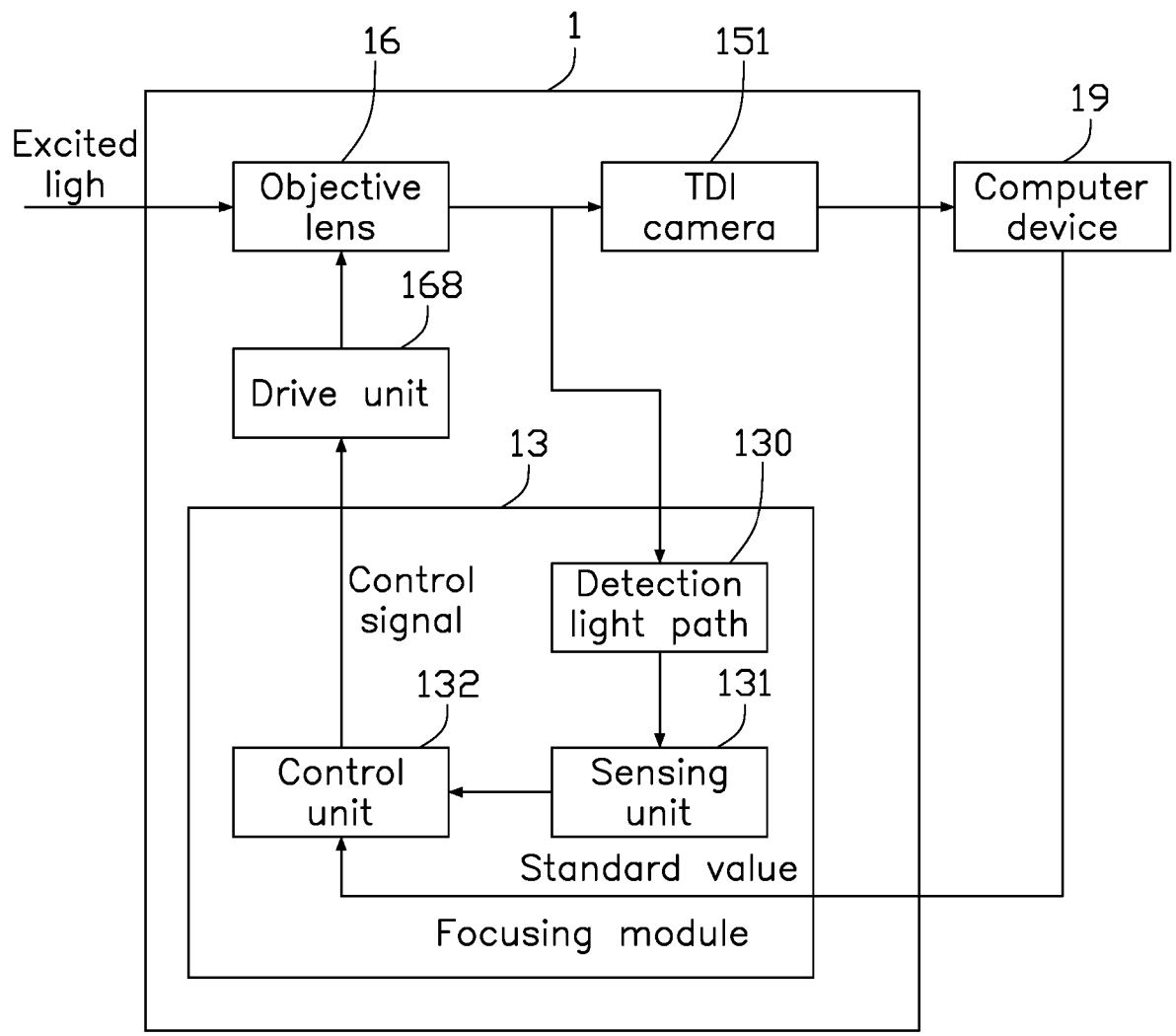
FIG. 16 is a schematic diagram showing a focusing module of the optical imaging system of FIG. 1 performing focusing.

FIG. 16 is a schematic diagram showing the focusing module 13 performing focusing in the embodiment. In the embodiment, the detection light emitted by the focusing module 13 is irradiated to the sample carrier 2 through the objective lens 16, is reflected back to the objective lens 16 by the sample carrier 2, and returns to the focusing module 13 along the same light path through the objective lens 16. The focusing module 13 determines whether the sample carrier 2 is located on the focal plane of the objective lens 16 according to the returned detection light. If the sample carrier 2 is not on the focal plane of the objective lens 16, the focusing module 13 sends a signal to the drive unit 168 that drives the objective lens 16 to move, and controls the drive unit 168 to drive the objective lens 16 to move closer to or further from the sample carrier 2, so that the sample carrier 2 is again on the focal plane of the objective lens 16.

Specifically, in the embodiment, imaging data of each TDI camera 151 is transmitted to a computer device 19, the computer device 19 comprehensively evaluates imaging quality of all TDI cameras 151 according to preset rules and determines a standard position of the objective lens 16 (that is, a position of the objective lens 16 in the Z direction when the sample carrier 2 is located on the focal plane of the objective lens 16) based on principle of optimal quality, and obtaining a standard value representing the standard position of the objective lens 16. The standard value is supplied to the focusing module 13. The focusing module 13 includes a detection light path 130, a sensing unit 131, and a control unit 132. The sensing unit 131 senses the returned detection light and outputs an electrical signal. The control unit 132 obtains the detection value according to the electrical signal output by the sensing unit 131, compares the detection value with the standard value, and obtains a control signal to control the drive unit 168 to drive the objective lens 16 to move closer to or further from the sample carrier 2.

Figure 17:
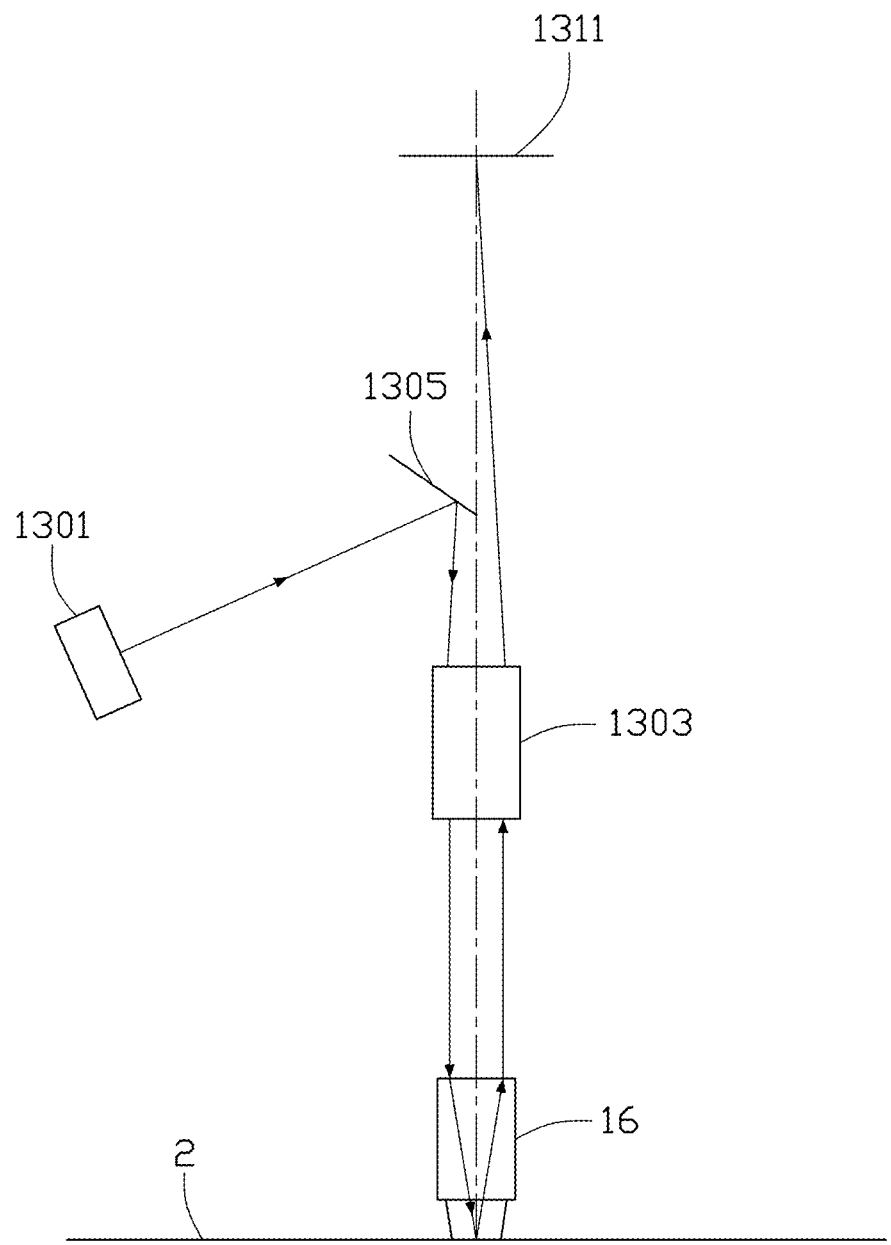
FIG. 17 is schematic diagram of a light path showing the focusing module of the optical imaging system of FIG. 1 performing focusing.
Figure 18A:
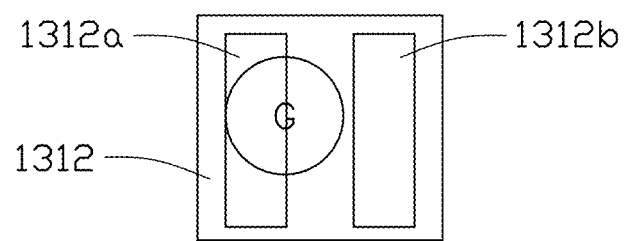
FIGS. 18A to 18C are schematic diagrams of detection light spot reflected by a sensor of the focusing module of FIG. 17.
Figure 18B:
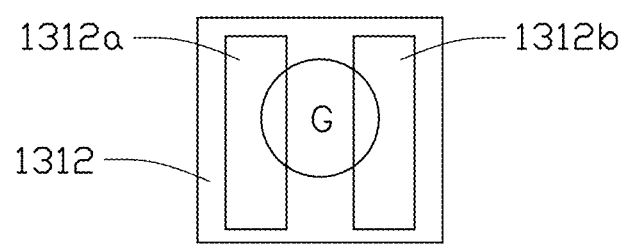
Figure 18C:
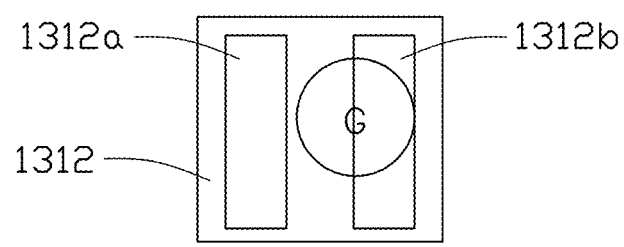

FIG. 17 is schematic diagram of a light path showing the focusing module 13 performing focusing in the embodiment. FIG. 18A to FIG. 18C are schematic diagrams showing the sensing unit 131 of the focusing module 13 sensing whether the sample carrier 2 is in the focal plane of the objective lens 16 in the embodiment. The detection light path includes a light source 1301 and a tube lens 1303. The sensing unit 131 includes a sensor 1311. The detection light emitted by the light source 1301 passes through the tube lens 1303 and the objective lens 16 (in the embodiment, it enters the tube lens 1303 after being reflected by a speculum 1305), is irradiated to the sample carrier 2 and is reflected by the sample carrier 2. The reflected detection light is irradiated to the sensor 1311 after passing through the objective lens 16 and the tube lens 1303. In the embodiment, the sensor 1311 adopts a photoelectric sensor, specifically a PD (Photodiode) sensor 1312. The PD sensor 1312 is provided with two sensing areas 1312a and 1312b. Positions of the detection light irradiated to the sensing areas 1312a and 1312b can determine a position between the sample carrier 2 and the objective lens 16. As shown in FIG. 18A, a spot G of the detection light is biased towards the sensing area 1312a, which means that the sample carrier 2 is above the focal plane of the objective lens 16. As shown in FIG. 18B, an area of the spot G of the detection light falling on the sensing area 1312a is the same as an area falling on the sensing area 1312b, or the difference between the two is within a preset range, which means that the sample carrier 2 is on the focal plane of the objective lens 16. As shown in FIG. 18C, the spot of the detection light is biased towards the sensing area 1312b, which means that the sample carrier 2 is below the focal plane of the objective lens 16. The sensing area 1312a converts a received optical signal into an electrical signal PD1 for output, and the sensing area 1312b converts a received optical signal into an electrical signal PD2 for output. The control unit 132 determines the defocus direction and defocus amount corresponding to the sample carrier 2 according to the two received electrical signals PD1 and PD2, and then controls the drive unit 168 to drive the objective lens 16 to move closer to or further from the sample carrier 2 by a necessary distance.

In the embodiment, a corresponding control signal DIV for controlling the drive unit 168 is generated by dividing a difference of the electrical signals PD1 and PD2 by their sum. Thus, signal noise can be effectively filtered out, and the focusing accuracy is thus not influenced by brightness fluctuation of the light source 1301. A calculation formula of generating the control signal DIV is as follows:

$$DIV=\alpha(DIFF/SUM+\beta)$$

Wherein, $\alpha$ is a signal amplification coefficient, a difference signal DIFF is the difference between PD1 and PD2, a sum signal SUM is the sum of PD1 and PD2, and $\beta$ is a preset voltage offset.

Figure 19:
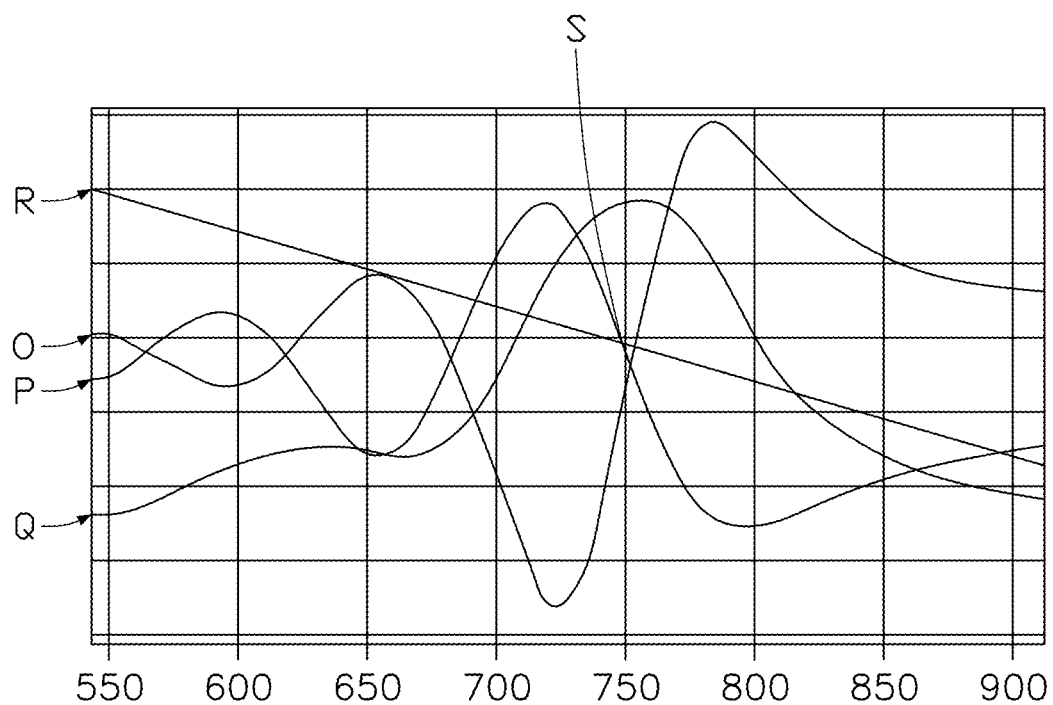
FIG. 19 shows spectrums of various signals obtained from measurement when the optical imaging system of FIG. 1 is in focus.

FIG. 19 shows changes of various signals obtained in focusing. Wherein, the abscissa represents a relative millimeter distance between the objective lens 16 and the sample carrier 2 in the Z-axis, curve O represents the difference signal DIFF, curve Q represents the sum signal SUM, curve P represents the control signal DIV, and curve R represents a relative coordinate position between the drive unit 168 and the sample carrier 2 in the Z-direction. In FIG. 19, an intersection point S of curve R and curve P represents the focal plane of the objective lens 16, and the value (DIV value) of curve P at the intersection point S is the standard value representing the standard position of objective lens 16.

Figure 20:
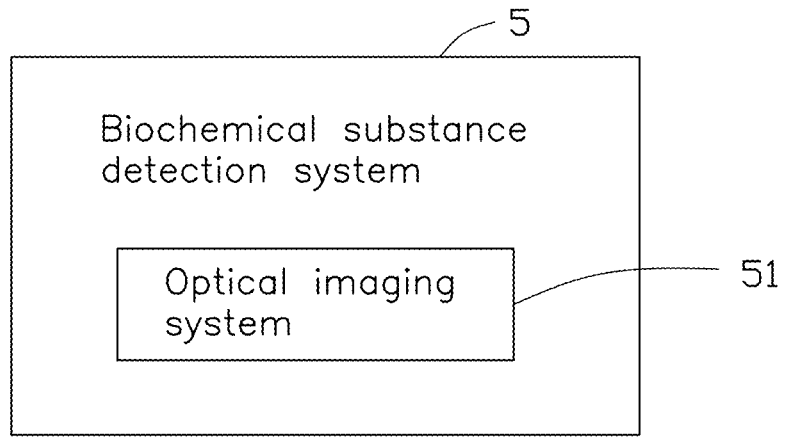
FIG. 20 is a schematic diagram of a biochemical substance detection system according to an embodiment of the present disclosure.

FIG. 20 is a schematic diagram of a biochemical substance detection system according to an embodiment of the present disclosure. The biochemical substance detection system 5 includes an optical imaging system 51. The optical imaging system 51 can be the optical imaging system 1 described in the above embodiments.

Figure 21:
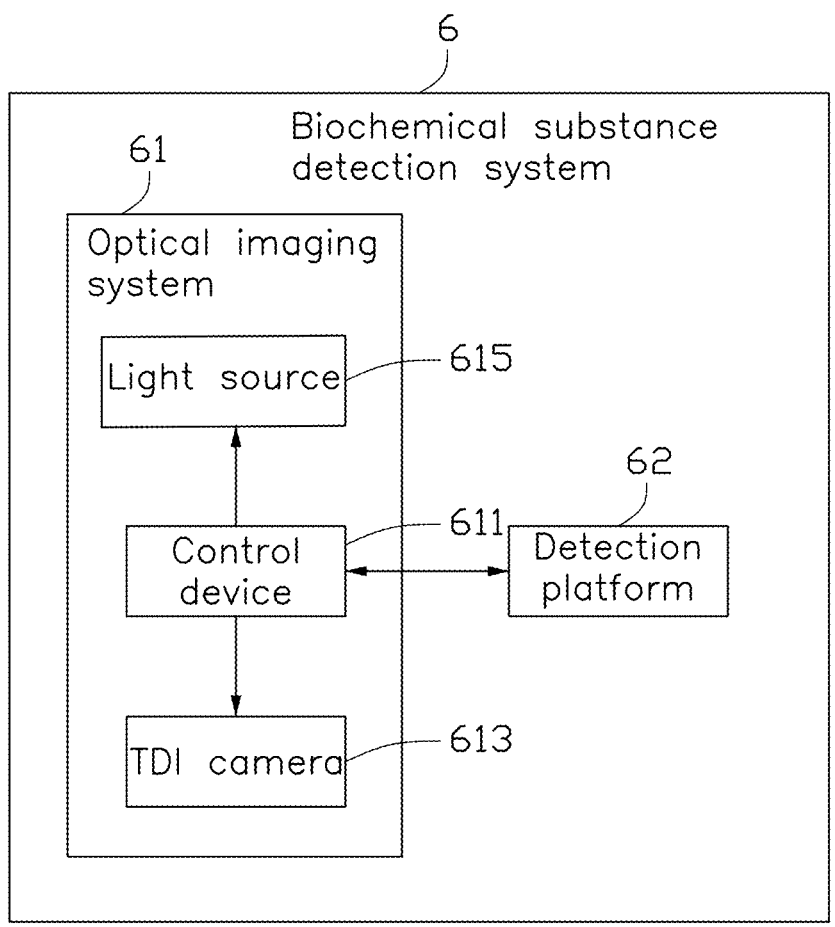
FIG. 21 is a schematic diagram of the biochemical substance detection system according to another embodiment of the present disclosure.

FIG. 21 is a schematic diagram of the biochemical substance detection system according to another embodiment of the present disclosure. The biochemical substance detection system 6 includes an optical imaging system 61 and a detection platform 62. The optical imaging system 61 can be the optical imaging system 1 described in the above embodiments, and the detection platform 62 is configured to carry the sample carrier. The detection platform 62 is a movable platform, and a control device 611 of the optical imaging system 61 is configured to control and coordinate the optical imaging system 61 and the detection platform 62. For example, the control device 611 is configured to control the moving speed of the detection platform 62 to match and synchronize with the frequency of the TDI camera 613 of the optical imaging system 61, and the control device 63 is also configured to control switch-on of the light source 615 of the optical imaging system 61 to synchronize with the photographing by the TDI camera 613. When the detection platform 62 reaches a specified position, the control device 611 triggers the light source 615 and the TDI camera 613 at the same time to keep the sample (not shown), the light source 615, and the TDI camera 613 carried on the detection platform 62 in synchronization. At the same time, the frequency of the TDI camera 613 automatically matches the moving speed of the detection platform 62, so that the photographed image is not deformed.

As mentioned above, in the optical imaging system and the biochemical substance detection system provided by the above embodiment, first, the industrial or scientific TDI camera is adopted to collect the excited light, which reduces the photographing time of each sample and improves the detection flux. Second, on the one hand, the excited light can be divided into multiple channels for imaging using the light filtering system composed of the light splitting device and the light filtering device, on the other hand, the interference of excitation light and other light, such as detection light, on the imaging of excited light is prevented, and the imaging quality is improved. Third, the output end face of the light source is a rectangle, or further a slender rectangle, and the excitation light output from the light source is shaped into an illumination spot suitable for the photosensitive surface of the TDI camera by the excitation light shaping unit, utilizing the light source energy to a large extent and improving the uniformity of the illumination spot. Fourth, the objective lens with special structure is adopted to enable a large field of view and a large numerical aperture, distortion and flat field achromatism being thereby reduced. Fifth, the focusing system is adopted, and the focusing system adjusts the distance between the objective lens and the sample carrier in real time, so that the sample carrier is kept on the focal plane of the objective lens, compensating for changes of distance between the sample carrier and the objective lens caused by a change of environmental temperature, mechanical vibration, sample flexing or other reasons, ensuring the imaging quality. Sixth, the focusing system adopts a specific method to calculate the distance between the sample carrier and the objective lens, which effectively eliminates the influence on the detection results of noise and a change of brightness of the detection light source.

It should be noted that the above description only describes a number of embodiments. However, it is not difficult for those skilled in the art to understand that more embodiments can be derived from the above specific embodiments. For example, the first shaping unit and the second shaping unit of the excitation shaping unit may not be limited to one lens, but may be composed of multiple lenses; the lens constituting the first shaping unit and the second shaping unit are also not to be limited to cylindrical lens, aspheric lens, spherical lens, or Fresnel lens. For another example, the number of TDI cameras and corresponding imaging channels is not limited to four, but can also be one or other number; each band-pass and cut-off band of the filter system can also be adjusted according to the specific situation; the design of the tube lens is not limited to the structure of two double cemented lenses, but other arrangements can be made according to the focal length or imaging requirements, such as using more lenses or just one lens.

It can be understood that the optical imaging system provided by the embodiment of the disclosure, in addition to being applied to the biochemical substance detection system, can also be applied to any other equipment that uses the excitation light for excitation and simultaneous imaging, so as to realize rapid imaging of the equipment.

Even though information and advantages of the embodiments have been set forth in the foregoing description, together with details of the structures and functions of the embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical imaging system configured for photographing a sample, comprising:
a lighting module;
an imaging module; and
an objective lens;
wherein the lighting module is configured for outputting excitation light to excite the sample to generate excited light, the imaging module comprises a time delay integration line scan camera, the time delay integration line scan camera is configured to record the excited light, the objective lens is a channel configured for outputting the excitation light and collect the excited light;
the objective lens comprises a first group of lenses, a second group of lenses, a third group of lenses, a fourth group of lenses, a fifth group of lenses, a sixth group of lenses, and a seventh group of lenses which are arranged from an object side to an image side in said sequence, the first group of lenses to the third group of lenses bear a negative power, and the fourth group of lenses to the seventh group of lenses bear a positive power;
the first group of lenses meets: $9.2<f1/fobj<9.7$; the second group of lenses meets: $4.7<f2/fobj<5.5$; the third group of lenses meets: $4.6<f3/fobj<5.6$; the fourth group of lenses meets: $3.25<f4/fobj<3.88$; the fifth group of lenses meets: $5.71<f5/fobj<6.11$; the sixth group of lenses meets: $-4.76<f6/fobj<-3$; the seventh group of lenses meets: $-23.9<f7/fobj<-19.5$; wherein, f1 is a focal length of the first group of lenses, f2 is a focal length of the second group of lenses, f3 is a focal length of the third group of lenses, f4 is a focal length of the fourth group of lenses, f5 is a focal length of the fifth group of lenses, f6 is a focal length of the sixth group of lenses, f7 is a focal length of the seventh group of lenses, and fobj is a focal length of the objective lens.

2. The optical imaging system of claim 1, wherein a numerical aperture of the objective lens is greater than or equal to 0.7, and a field of view of the objective lens is greater than φ1.2 mm.

3. The optical imaging system of claim 2, wherein the first group of lenses has a positive power and is configured to generate a positive field curvature, the second group of lenses has a positive power and is configured to bear a positive deflection angle with the first group of lenses, the third group of lenses has a positive power and is configured to correct comatic aberration and chromatic aberration, the fourth group of lenses has a positive power, the fifth group of lenses has a positive power, the sixth group of lenses has a negative power, the seventh group of lenses has a negative power, and the sixth group of lenses and the seventh group of lenses are configured to control a field curvature and distortion.

4. The optical imaging system of claim 3, wherein the third group of lenses comprises three lenses which are glued together to form a triple cemented lens group; and/or, the fifth group of lenses comprises two lenses which are glued together to form a double cemented lens group; and/or, the sixth group of lenses comprises two lenses which are glued together to form a double cemented lens group; and/or, the seventh group of lenses comprises two lenses which are glued together to form a double cemented lens group.

5. The optical imaging system of claim 3, further comprising a filter system arranged between the objective lens and the time delay integration line scan camera, and the filter system prevents light beyond a specific wavelength from entering the time delay integration line scan camera.

6. The optical imaging system of claim 5, further comprising a tube lens arranged between the filter system and the time delay integration line scan camera, distortion of a combination of the tube lens and the objective lens is less than 1%.

7. The optical imaging system of claim 6, wherein a focal length of the tube lens is 150 mm to 250 mm; and/or, the tube lens comprises four lenses which are glued together to form two double cemented lenses.

8. The optical imaging system of claim 5, wherein the filter system comprises a light splitting device and a filter, the light splitting device guides the excited light to different imaging channels to be recorded by different time delay integration line scan cameras, and the filter is configured to prevent the light beyond a specific wavelength from entering each time delay integration line scan camera.

9. The optical imaging system of claim 3, further comprising a focusing module, wherein the focusing module is configured to detect a positional relationship between a sample carrier carrying the sample and the objective lens, and adjust a relative position between the sample carrier and the objective lens according to the positional relationship, so that the sample carrier is located on a focal plane of the objective lens.

10. The optical imaging system of claim 9, wherein the focusing module comprises a light source for outputting detection light to irradiate the sample carrier and a sensing unit for sensing detection light reflected from the sample carrier, the sensing unit outputs an electrical signal reflecting the positional relationship between the sample carrier and the objective lens according to reflected detection light.

11. The optical imaging system of claim 10, wherein the focusing module further comprises a control unit, the control unit is configured to determine a defocusing direction and defocusing amount of the sample carrier away from the focal plane of the objective lens according to the electrical signal, and to control the objective lens to move closer to or further from the sample carrier by a distance, so that the sample carrier is again located on the focal plane of the objective lens.

12. The optical imaging system of claim 11, wherein the sensing unit comprises a photoelectric sensor, the photoelectric sensor is provided with two sensing areas, each sensing area converts received detection light into an electrical signal, and the control unit determines the defocusing direction and defocusing amount of the sample carrier deviating from the focal plane of the objective lens by diving a difference of the electrical signals output by the two sensing areas by a sum of the electrical signals output by the two sensing areas.

13. The optical imaging system of claim 12, wherein the control unit calculates a control signal for controlling movement of the objective lens according to a calculation formula of $DIV=\alpha(DIFF/SUM+\beta)$, wherein DIV is the control signal, α is a signal amplification coefficient, DIFF is a difference signal of electrical signals output by the two sensing areas, SUM is a sum signal of electrical signals output by the two sensing areas, and β is preset voltage offset.

14. A biochemical substance detection system, comprising an optical imaging system of claim 1.

15. The biochemical substance detection system of claim 14, further comprising a detection platform, wherein the detection platform is configured to carry the sample.

16. The biochemical substance detection system of claim 15, wherein the optical imaging system further comprises a control device, the control device is configured to communicate with the detection platform to control synchronization of the optical imaging system with the detection platform.

17. The biochemical substance detection system of claim 16, wherein the control device is configured to control a moving speed of the detection platform to match and keep synchronized with a frequency of the time delay integration line scan camera, and to control switch-on of the lighting module to keep synchronized with photographing by the time delay integration line scan camera.

* * * * *